US008968881B2

(12) United States Patent
Furukawa et al.

(10) Patent No.: US 8,968,881 B2
(45) Date of Patent: Mar. 3, 2015

(54) PRECOATED METAL SHEET AND METHOD OF PRODUCTION OF PRECOATED METAL SHEET

(75) Inventors: Hiroyasu Furukawa, Kimitsu (JP); Hiroshi Kanai, Kimitsu (JP); Kenji Inada, Kimitsu (JP); Katsunori Tobisawa, Kimitsu (JP); Shigenori Tanaka, Tokyo (JP); Kohei Ueda, Futtsu (JP); Kengo Yoshida, Kimitsu (JP); Yoshihiro Suemune, Kimitsu (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 1780 days.

(21) Appl. No.: 11/792,353

(22) PCT Filed: Dec. 5, 2005

(86) PCT No.: PCT/JP2005/022709

§ 371 (c)(1), (2), (4) Date: Jun. 4, 2007

(87) PCT Pub. No.: WO2006/062214

PCT Pub. Date: Jun. 15, 2006

(65) Prior Publication Data

US 2008/0003446 A1 Jan. 3, 2008

(30) Foreign Application Priority Data

Dec. 8, 2004 (JP) ................................. 2004-355356
Dec. 24, 2004 (JP) ................................. 2004-373521
Dec. 24, 2004 (JP) ................................. 2004-374073

(51) Int. Cl.
*B32B 15/18* (2006.01)
*B05D 7/14* (2006.01)
*B05D 7/00* (2006.01)

(52) U.S. Cl.
CPC ................ *B05D 7/14* (2013.01); *B05D 7/5323* (2013.01); *B05D 7/50* (2013.01); *B05D 2202/15* (2013.01); *B05D 2701/00* (2013.01)
USPC ................ 428/612; 428/687; 427/216; 427/8

(58) Field of Classification Search
USPC ......... 428/612, 687, 141, 142, 457, 458, 463, 428/425.8; 427/216, 8
See application file for complete search history.

(56) References Cited

U.S. PATENT DOCUMENTS 3,565,681 A * 2/1971 Walters et al.
4,233,346 A 11/1980 Kerkhofs (Continued)

FOREIGN PATENT DOCUMENTS

JP 63-175674 A 7/1988
JP 63-268636 11/1988

(Continued)

OTHER PUBLICATIONS

Machine_English_Translation_JP_06190334_A; Suzuki, Atsushi; Preparation of Coated Metal Sheet; Jul. 12, 1994; JPO; whole document.*

(Continued)

*Primary Examiner* — Aaron Austin
*Assistant Examiner* — Tahseen N Khan
(74) *Attorney, Agent, or Firm* — Kenyon & Kenyon LLP

(57) ABSTRACT

A precoated metal sheet produced by simultaneous multi-layer coating, and a process for producing the same, is provided with improved color shading prevention and adhesion. In the precoated metal plate, the centerline average roughness Ra in the coating film interface is not less than 0.3 μm, and the maximum height from the waviness center line in the interface is not more than 50% of the layer thickness. Also provided is (i) a top clear coated metal plate, which comprises a clear layer as an upper layer, has an interfacial centerline average roughness Ra of 0.3 to 0.7 μm and has excellent weathering resistance; and (ii) a precoated metal plate having excellent processability and corrosion resistance, which contains not less than 30% by mass of a rust preventive pigment.

8 Claims, 10 Drawing Sheets

(56) References Cited

U.S. PATENT DOCUMENTS

| | | | | |
|---|---|---|---|---|
| 4,313,980 | A | 2/1982 | Willemsens | |
| 4,916,019 | A | 4/1990 | Nakatani et al. | |
| 2003/0054095 | A1* | 3/2003 | Mandai et al. | 427/128 |
| 2005/0019482 | A1* | 1/2005 | Mandai et al. | 427/8 |
| 2006/0147673 | A1* | 7/2006 | Ueda et al. | 428/141 |

FOREIGN PATENT DOCUMENTS

| | | | | |
|---|---|---|---|---|
| JP | 01304934 | A | * | 12/1989 |
| JP | 2-105331 | A | | 4/1990 |
| JP | 02-270546 | | | 11/1990 |
| JP | 4-131165 | | | 5/1992 |
| JP | 06-134925 | | | 5/1994 |
| JP | 6-190334 | | | 7/1994 |
| JP | 6-190335 | A | | 7/1994 |
| JP | 6-190336 | | | 7/1994 |
| JP | 06190334 | A | * | 7/1994 |
| JP | 7-24401 | A | | 1/1995 |
| JP | 07-136578 | | | 5/1995 |
| JP | 8-309917 | | | 11/1996 |
| JP | 9-122579 | A | | 5/1997 |
| JP | 9-122879 | | | 5/1997 |
| JP | 09-286073 | | | 11/1997 |
| JP | 10-005693 | | | 1/1998 |
| JP | 10008395 | A | * | 1/1998 |
| JP | 11-019583 | | | 1/1999 |
| JP | 2003-293167 | | | 10/2003 |
| JP | 2003-326639 | A | | 11/2003 |
| JP | 2004-176113 | | | 6/2004 |
| JP | 2004-338254 | A | | 12/2004 |
| JP | 2004338254 | A | * | 12/2004 |
| WO | WO 2004/005579 | A1 | | 1/2004 |
| WO | WO 2004076172 | A1 | * | 9/2004 |

OTHER PUBLICATIONS

Machine_English_Translation_JP_2004338254_A; Koizumi, Fumitake; Metallized Paper; Dec. 2, 2004; JPO; whole document.*

Machine English_Translation_JP_10008395_A; Kiyoyanagi, Noriko; Vapor Metallized Paper for Label; Jan. 13, 1998; JPO; whole document.*

Korean Office Action dated May 19, 2010 issued in corresponding Korean Application No. 10-2010-7000334.

Journal of the Japan Coating Technology Association, 2001, vol. 36, No. 8, pp. 266 to 271.

Allowance of Patent dated Aug. 9, 2011 issued in corresponding Korean Application No. 10-2010-7000334, and English translation thereof.

European Search Report in European application No. 05814403.1 dated Mar. 9, 2011.

European Search Report dated Oct. 25, 2013, issued in corresponding European Application No. EP 13182604.2.

* cited by examiner 15.0kV x500 100um $$Ra=\frac{1}{l}\int_0^l |f(x)|dx$$

PRECOATED METAL SHEET AND METHOD OF PRODUCTION OF PRECOATED METAL SHEET

TECHNICAL FIELD

The present invention relates to a precoated metal sheet used for home electrical appliances, building materials, automobiles, furniture, and other applications and a method of production of the same. More particularly, the present invention relates to a precoated metal sheet produced by multilayer simultaneous coating, having an interface of the formed multilayer coats exhibit a predetermined centerline average roughness Ra, and preventing mottled-like tone and simultaneously improving the adhesion between the coats, a top clear type precoated metal sheet superior in weather resistance, and a precoated metal sheet achieving both workability and corrosion resistance and methods of production of the same.

BACKGROUND ART

In the past, metal sheets have often been painted after being worked in order to improve the rust preventing performance and appearance. For example, steel sheet is often given a baked on paint after working. Postcoating metal sheet after working necessitates a large space for the painting work and is not necessarily good in terms of the work environment either. Further, disposal of the waste products generated there is necessary.

Explaining this with reference to the case of steel sheet, in recent years there has been much activity in use of precoated steel sheet painted in advance so as to eliminate the painting process after working and thereby lower the costs. In precoated steel sheet, the base steel sheet is conversion-treated, then formed with a primer layer and then formed with one or more coat layers. The primer layer is sometimes omitted. The back surface is often painted with a single layer called a "service coat".

In the production of conventional precoated steel sheet having two or more coat layers in addition to the primer layer, the practice has been to form a single lower layer paint film on the primer layer using a curtain coater or roll coater, dry and bake it on, then again use a curtain coater or roll coater to form a single upper layer paint coat and dry and bake it on.

As the advantages of the precoated steel sheet produced in the past, two points may be mentioned: (1) the paintin work is performed by the manufacturer and there is no painting work at the user, so the solvent can be disposed of all together and (2) an entire lot can be painted together, so the quality is stable.

On the other hand, the following may be mentioned as difficulties with conventional precoated steel sheet: (1) When producing the sheet by the method of coating and drying single layers at a time, since the sheets are worked after painting, the coats sometimes peel off at the time of working. (2) From the viewpoint of production costs, coating and drying two layers repeatedly was suitable (painting lines for giving three or more layers were rare), so if desiring to coat three or more layers of coats so as to improve the performance of the coats, the sheets had to be passed through a two-layer coat line two times and therefore the productivity fell.

If it were possible to apply simultaneous multilayer coating at the time of production of precoated steel sheet, the following advantages could be anticipated. First, two or more layers of coats could be simultaneously painted, so the process could be simplified compared with the conventional repeated painting of single layers. Second, three or more layer multilayer coats could also be coated simultaneously, so a further improvement in efficiency could be expected. Third, in the past, in "wet-on-wet painting" forming another paint layer on a not yet dried paint layer and simultaneously drying and baking them on, the adhesion between the coats is reportedly improved, so the adhesion between coats can be expected to be improved over that of the conventional repeated painting of single layers.

In the past, several proposals have been made for multilayer simultaneous coating of the surface of steel sheet. For example, JP 6-190335 A describes that if making the surface tension of a lower layer higher than the surface tension of an upper layer in painted steel sheet produced by a multilayer simultaneous coater, the sharpness is improved. The Examples describe that "as the lower layer paint, a polyester based primer paint was used, while as the upper layer paint, a high molecular weight polyester based top coat paint was used. The paints were adjusted in surface tension by surfactants to make the surface tension of the lower layer paint 35 mN/m and make the surface tension of the upper layer paint 28 mN/m. These paints were simultaneously coated by a slide hopper type curtain coater so that the dried thickness of the primer coat became 5 μm and the top coat became 10 μm. The steel sheet coated with the paints was then dried and cured by an induction heating oven, whereupon a high sharpness steel sheet could be obtained."

JP 6-190336 A proposes a method of production of a patterned steel sheet. The Examples describe use of high molecular weight polyester based top coat paints as paints, making the paint forming the upper layer on the surface of the steel sheet white, making the paint forming the lower layer black, adjusting the surface tensions of the paints by surfactants so as to create patterns and making the surface tension of the upper layer paint 35 mN/m and the surface tension of the lower layer paint 28 mN/m, and simultaneously coating these two paints by a slide hopper type coater to give dried thicknesses of 10 μm each.

Production of a precoated metal sheet by multilayer simultaneous coating using a slide hopper type coater is described in for example JP 6-190334 A etc.

One type of precoated metal sheet, that is, top clear type precoated steel sheet, combines a topmost layer clear paint and a lower layer colored base coat paint so as to give a heavy feel and luxurious feel to the appearance. This has been used for automobiles, home electrical appliances (in particular outdoor electrical appliances), building materials (in particular outdoor building materials), etc. In general, in such top clear type precoated steel sheet, as the topmost layer acrylic paint, a polyester-based, acryl-based, PET-based, silicone polyester-based, silicone-based, silicone acryl-based, fluorine-based, or other resin has been used.

In the case of outdoor use, mainly a polyester-based, acryl-based, fluorine-based, silicone-based, silicone polyester-based, or silicone acryl-based clear paint has been used. However, a polyester-based one is inferior in weather resistance, so has the problem that with long term use, the clear paint deteriorates and peels off, while an acryl-based one is superior to a polyester-based one in weather resistance, but is still insufficient in weather resistance. On the other hand, as an example of use of a fluorine-based one, for example, JP 4-131165 A reports use of a water-based fluorine resin for a top clear paint. JP 10-5693 A reports the method of use of a fluorine resin for a top clear paint of a cosmetic metal sheet having an appearance close to that of natural stone or rock. While it is true that use of a fluorine-based resin for a clear paint in this way improves the weather resistance, there was the problem that the cost became higher.

In the case of a top clear type precoated metal sheet of a type comprised of a plurality of coat layers in this way in which the topmost layer is a transparent or semitransparent clear layer, there is the feature that even if the topmost layer deteriorates, there will be little chalking due to exposure of the pigment and therefore the appearance will remain superior at the time of long term use.

However, there was the problem that the interface between the clear layer and the lower layer coat below it deteriorated due to light and therefore the lower layer coats and clear layer easily peeled apart. The reason is believed to be that the major cause of the deterioration, UV rays, pass through the clear layer and cause the surfacemost layer of the lower layer coats to deteriorate. To prevent this deterioration, the methods have been adopted of adding an expensive UV absorbent to the clear layer (*Journal of the Japan Coating Technology Association,* 2001, vol. 36, no. 8, pp. 266 to 271) etc., but in general this is costly and is insufficient in effect of preventing deterioration.

Precoated metal sheet is shaped at the demand side, so superior workability is considered of the primary importance, but in addition to this, in particular corrosion resistance is sought in some cases. For example, JP 8-309917 A discloses precoated metal sheet superior in not only workability, but also end face corrosion resistance. In the precoated metal sheet described in JP 8-309917 A, the two sides of galvanized metal sheet are formed with coats containing a rust preventing pigment in an amount of 25% or more. It describes that if the content of the rust preventing pigment becomes 50%, the workability sometimes falls. Further, it describes that a topcoat can be formed. The Examples describe an example of production by coating a paint containing a rust preventing pigment by a roll coater, then baking it, followed by coating a topcoat paint by a roll coater again and then baking it, that is, two coatings and two bakings (in general, abbreviated as the "2 coat, 2 bake (2C2B)").

An ordinary precoated metal sheet is produced by separately forming a lower layer coat and an upper layer coat by the above explained method of two coatings and two bakings. The method of forming two layers of paint film (comprised of a colored base paint layer and a clear paint layer) by the wet-on-wet method (that is, forming a clear paint layer over a colored base paint layer before baking) and baking them once to form two layers of coats (in general, abbreviated as the "2 coat, 1 bake (2C1B)") is also known (for example, JP 11-19583 A).

As described in JP 8-309917 A, it is known that if increasing the content of the rust preventing pigment in the coats, the precoated metal sheet is impaired in workability. Further, in a general precoated metal sheet of a two-layer structure of a lower layer and upper layer, it is known that it is no longer possible to raise the corrosion resistance of the precoated metal sheet as desired as will be understood from the fact that if increasing the rust preventing pigment of the lower layer, saltwater invades the interface of the two layers in a saltwater spray test (SST) and causes blisters.

DISCLOSURE OF THE INVENTION

The inventors produced precoated steel sheet using the multilayer simultaneous coating method described in JP 6-190335 A and JP 6-190336 A whereupon they found that the surfaces of the steel sheets after painting experience mottled-like tone. "Mottled-like tone" is the phenomenon where if examining the appearance of the coats of a coated steel sheet by the naked eye or a loupe, unevenness comprised of patches of color different from the surrounding color are recognized.

Further, the inventors expected an improvement on the adhesion between coats, but learned that the adhesion is not necessarily always improved.

The present invention has as its object to prevent mottled-like tone in the surface appearance and simultaneously improve the adhesion between coats of precoated metal sheet such as precoated steel sheet produced by multilayer simultaneous coating using a multilayer simultaneous coater.

The present invention further has as its object the provision of a top clear type precoated metal sheet solving the above defects of the prior art and superior in weather resistance.

Provision of a precoated metal sheet achieving both workability and corrosion resistance is also an object of the present invention.

The inventors engaged in various experiments to make use of the characteristics inherent in precoated steel sheet produced by multilayer simultaneous coating and as a result found, as features of the interface between multilayer coats obtained by the multilayer simultaneous coating method, that waviness is recognized at the interface enlarged by a low magnification of ×500 (compared with the interface seen when forming the upper and lower coats by separately coating and baking these paints, an interface where the upper layer enters the lower layer and the lower layer enters the upper layer resulting in a wavy shape) and that if further observing the interface by a high magnification of ×5000, fine roughness is seen at the wavy interface. Further, they discovered that such a wavy interface and fine roughness at the interface itself can be controlled by adjusting the surface tensions of the upper layer and lower layer paints and were therefore able to propose means for simultaneously solving the problems of adhesion between coats and mottled-like tone of the coat appearance. Due to this, they realized precoated steel sheet by multilayer simultaneous coating having properties superior to those of conventional precoated steel sheet on which single individually formed layers are laminated. These developed techniques are not limited to precoated steel sheet and can also be applied to general precoated metal sheet obtained by forming coats on unworked metal sheet by multilayer simultaneous coating.

In the present invention, "multilayer simultaneous coating" means to simultaneously coat a metal sheet with two or more layers of different paints to form multiple layers of paint films and then simultaneously dry and bake these paint layers to form multilayer coats.

Here, the framework of the precoated metal sheet of the present invention preventing mottled-like tone and simultaneously improving the adhesion between coats and the methods of production of the same will be explained below.

(1) A precoated metal sheet produced by multilayer simultaneous coating comprised of a metal sheet formed on the surface with two or more layers of coats using a multilayer simultaneous coating system, said precoated metal sheet characterized in that a centerline average roughness Ra of the interface of the coats is 0.3 μm or more and in that a maximum height of waviness of the interface from its centerline observed by a magnification of ×500 is 50% or less of the thickness of the layer positioned above the interface measured from said centerline.

(2) A method of production of precoated metal sheet comprising applying paints to the surface of a metal sheet using a multilayer simultaneous coating system, said method of production of precoated metal sheet characterized by adding a leveler to an upper layer paint to adjust a difference of surface tensions of a lower layer paint and upper layer paint to 1.2 mN/m to less than 5 mN/m and using, as the different layer paints, paints with a difference between the maximum value and minimum value of measured surface tensions obtained when measuring the surface tensions five times of less than 2 mN/m.

(3) A method of production of precoated metal sheet comprising applying paints to the surface of a metal sheet using a multilayer simultaneous coating system, said method of production of precoated metal sheet characterized by adding a leveler to both an upper layer paint and a lower layer paint to adjust a difference of surface tensions of the lower layer paint and the upper layer paint to 0.3 mN/m to less than 3.7 mN/m and using as the different layer paints paints with a difference between the maximum value and minimum value of measured surface tensions obtained when measuring the surface tensions five times of less than 2 mN/m.

In a precoated metal sheet preventing mottled-like tone of the present invention, an "upper layer" or an "upper coat layer" means a coat layer positioned at the uppermost position among the colored layers in the two or more paint layers painted on the surface of a metal sheet by a multilayer simultaneous coating system, while a "lower layer" or a "lower coat layer" means a coat layer positioned adjoining that colored uppermost layer under it. In the case of forming three or more layers by multilayer simultaneous coating, when the relationship shown in the above (2) or (3) stands for all combinations of the adjoining layers simultaneously coated, it is possible to suppress occurrence of mottled-like tone.

In the present invention, the "leveler" is a type of surface adjuster of a paint and is also called a "leveling agent". It is an additive having characteristics leveling the surface of a paint. Regarding the addition of a suitable leveler, as explained later, it is possible to judge whether "orange peel like" surface roughness will occur in the wet state when coating a paint to which a leveler has been added by a single layer.

According to the present invention, by producing a precoated metal sheet by multilayer simultaneous coating without allowing the occurrence of mottled-like tone of the coats, it is possible to simultaneously coat two or more layers of coats, so it is possible to simplify the process compared with the conventional repeated coating of single layers. In the present invention, it is possible to form multilayer coats of three or more layers by simultaneous coating and thereby further improve the efficiency.

Further, according to the present invention, it is possible to provide a precoated metal sheet not inferior in mottled-like tone and better in adhesion compared with a conventional multilayer precoated metal sheet produced by repeated coating of single layers.

The inventors discovered that if controlling the fine roughness at the wavy interface between coats formed by multilayer simultaneous coating, it is possible to obtain a top clear type precoated metal sheet superior in weather resistance.

The top clear type precoated metal sheet superior in weather resistance of the present invention is based on this discovery. More particularly, it is a precoated metal sheet including at least a metal sheet and two or more layers of coats formed on that metal sheet using a multilayer simultaneous coating system, characterized in that the coats include at least a transparent or semitransparent upper clear layer and a lower coat layer adjoining that upper clear layer and in that a centerline average roughness Ra of an interface between the upper clear layer and lower coat layer is 0.3 to 0.7 μm.

Preferably, one or both of the lower coat layer and upper clear layer includes an ingredient (curing agent) reacting with both the paint resin of that layer and the paint resin of another layer.

In the precoated metal sheet of the present invention having the above configuration, it is believed that based on the fact that the Ra of the interface between the uppermost layer (clear layer) and the lower coat layer adjoining it is 0.3 to 0.7 μm, by the combination of the increase of the area of the interface and the increase of the ratio of the irregular reflection at the interface, it is possible to suppress photo deterioration of the interface between the clear layer and lower layer coats and secure adhesion and therefore improve the weather resistance.

As opposed to this, it is believed that, in a conventional precoated metal sheet having a top clear layer, the light passing through the top clear layer caused photo deterioration at the interface with the colored layer at the lower layer adjoining it, the adhesion was impaired at the interface between the top clear layer and the colored layer, and peeling easily occurred, so the precoated metal sheet was insufficient in weather resistance.

As explained above, according to the present invention, it is possible to obtain a precoated metal sheet where interlayer peeling between the top clear layer and lower layer coat is effectively suppressed and the weather resistance is improved.

Further, in the precoated metal sheet of the present invention, since it is no longer absolutely necessary to use an ultraviolet (UV) absorbent in the top clear layer (this was essential in a conventional top clear type coated sheet), it is possible to reduce or eliminate the amount of the expensive UV absorbent used.

The inventors further discovered that by suppressing the fine roughness at the wavy interface between the multilayer coats formed by multilayer simultaneous coating and controlling the contents of the rust preventing pigment in the coats, it is possible to obtain a precoated metal sheet achieving both workability and corrosion resistance.

More specifically, the inventors discovered that by forming by multilayer simultaneous coating a lower layer containing an average 30 wt % or more of a rust preventing pigment and an upper layer containing the same rust preventing pigment as the rust preventing pigment in the lower layer by an average content lower than the average content of the lower layer and by a concentration gradient gradually decreasing the further from the vicinity of the interface with the lower layer and suitably adjusting the centerline average roughness Ra at the wavy interface of the two layers, a precoated metal sheet superior in workability and superior in corrosion resistance can be obtained.

The precoated metal sheet of the present invention achieving both workability and corrosion resistance is based on this discovery. Its framework is as follows:

(1) A precoated metal sheet produced by multilayer simultaneous coating and superior in workability and corrosion resistance characterized by comprising a lower coat layer and an upper coat layer thereon which are formed on a metal sheet by a multilayer simultaneous coating system, wherein the lower coat layer contains an average 30 wt % or more of a rust preventing pigment, the upper coat layer contains a rust preventing pigment the same as the rust preventing pigment in the lower coat layer by an average content lower than the average content of the lower coat layer and by a concentration gradient gradually decreasing the further from the vicinity of the interface with the lower coat layer, and the centerline average roughness Ra of the interface between the lower coat layer and upper coat layer is 0.3 to 0.7 μm.

(2) A method of production of precoated metal sheet produced by multilayer simultaneous coating system and superior in workability and corrosion resistance, said method of production of precoated metal sheet characterized by causing part of the rust preventing pigment in a lower coat layer to disperse in an upper coat layer when baking a paint film comprising a lower coat layer containing a rust preventing pigment and an upper coat layer thereon formed by multilayer simultaneous coating so that the average concentration of the rust preventing pigment in the lower layer formed by baking becomes 30 wt % or more and so that the same rust preventing pigment as the rust preventing pigment in the lower layer is present in the upper layer by an average content lower than the average content of the lower layer and by a concentration gradient gradually decreasing the further from the vicinity of the interface with the lower layer and by adding a leveler to the upper coat layer or the upper coat layer and lower coat layer so that the centerline average roughness Ra of the interface between the lower coat layer and upper coat layer becomes 0.3 to 0.7 μm.

In the precoated metal sheet produced by multilayer simultaneous coating and superior in workability and corrosion resistance of the present invention, it is possible to increase the rust preventing pigment of the lower layer, so is thereby possible to secure corrosion resistance and secure adhesion between the upper layer and lower layer and thereby improve the workability of the precoated metal sheet and further improve the corrosion resistance.

The precoated metal sheet achieving both workability and corrosion resistance of the present invention may be a precoated metal sheet obtained by simultaneously coating three or more layers or may be a precoated metal sheet comprising for example two layers including rust preventing pigments so as to satisfy the requirements of the present invention and a clear coat serving as a top coat over the same.

BEST MODE FOR CARRYING OUT THE INVENTION

Figure 1:
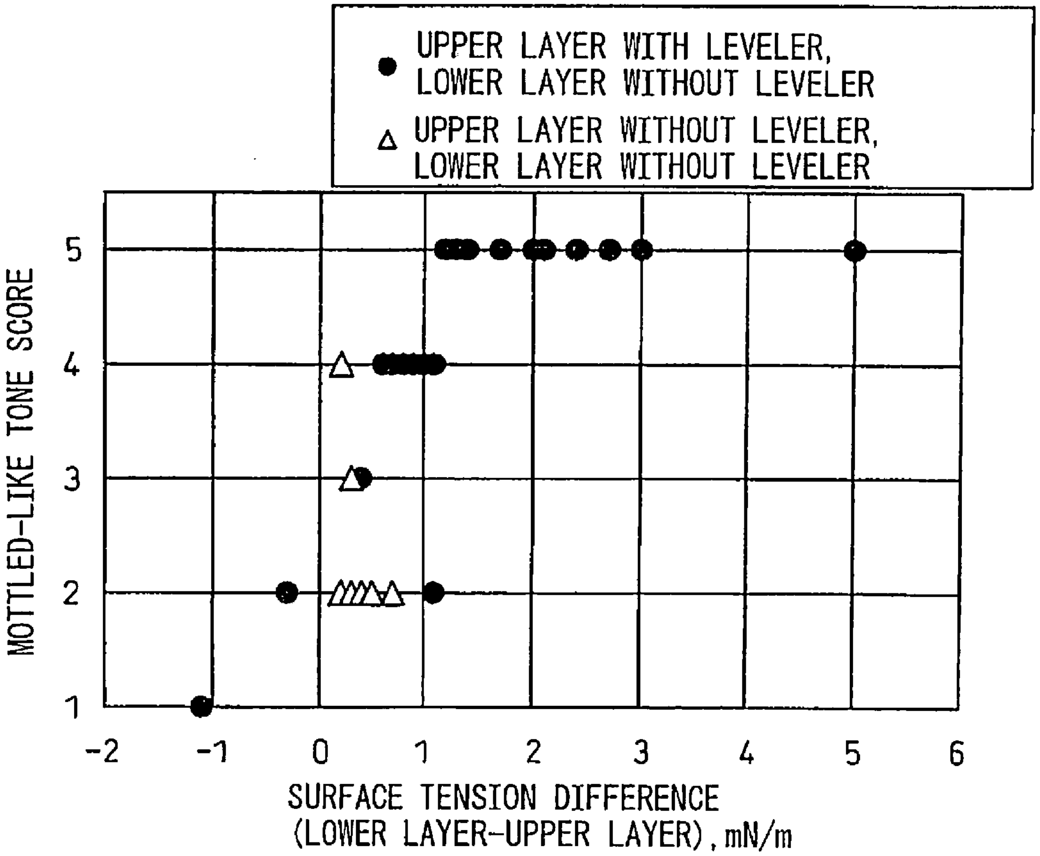
FIG. 1 is a view of the relationship between the difference in surface tensions of a lower layer and an upper layer and a mottled-like tone score.

The precoated metal sheet of the present invention is comprised of various types of metal sheet having multilayer structure coats of two or more layers formed by multilayer simultaneous coating. As the base metal sheet, for example, steel sheet, aluminum sheet, titanium sheet, etc. may be used, but the metal sheet is not limited to these.

The metal sheet may also be treated before coating. Further, it may be coated with a primer paint before the coating by the multilayer simultaneous coating system both when treating the metal sheet before coating and when not.

As examples of usable steel sheet, cold rolled steel sheet, hot rolled steel sheet, galvanized steel sheet, alloyed galvanized steel sheet, zinc-iron alloy plated steel sheet, zinc-aluminum alloy plated steel sheet, aluminum plated steel sheet, chrome plated steel sheet, nickel plated steel sheet, zinc-nickel alloy plated steel sheet, tin plated steel sheet, or other steel sheet may be mentioned. The steel sheet may if necessary be pretreated (treated before coating). As the pretreatment, there are cold water washing, hot water washing, pickling, alkali degreasing, grinding, polishing, chromate treatment, zinc phosphate treatment, compound oxide film treatment, and other nonchromate type treatment etc. These may be used alone or in combination to treat the steel sheet before coating.

Below, the present invention will be explained with reference to the example of a representative metal sheet as constituted by steel sheet.

In the past, when using a multilayer simultaneous coating system for multilayer simultaneous coating and simultaneous baking of steel sheet, as exampled above, the coats sometimes suffered from “mottled-like tone”.

There was no knowledge in the past on what circumstances this mottled-like tone occurred under. Therefore, first, the inventors analyzed the occurrence of mottled-like tone and studied the locations of occurrence of mottled-like tone. For this purpose, they compared the state of occurrence of mottled-like tone for multilayer precoated steel sheet dried without passing through a furnace and multilayer precoated steel sheet after passing through a furnace. As a result, they found that mottled-like tone did not occur if drying without passing through a furnace. On the other hand, they used a furnace for a heating test and observed the sheet in that case, whereupon they found that when heating by the ordinary heating rate for precoated steel sheet of 3 to 7° C./sec, mottled-like tone occurred at some precoated steel sheet at a temperature of 90 to 120° C. Therefore, they learned that mottled-like tone occurs in the furnace.

Next, they examined the cross-section of the coats where mottled-like tone occurred at a magnification of ×500, whereupon they observed thick parts and thin parts in the lower layer coat and, corresponding to this, thin parts and thick parts of the upper layer coat. Therefore, the interface of the upper and lower coat layers had the upper layer entering the lower layer and the lower layer entering the upper layer resulting in a wavy appearance. However, no mixture of the coats of the upper layer and lower layer was observed. The interface between the upper layer and lower layer when forming them separately appears flat when observed by the same magnification, so it was learned that this wavy interface was a feature of the interface of coats formed by multilayer simultaneous coating. From this, it was learned that if the thicknesses of the upper layer and the lower layer become excessively uneven, mottled-like tone will be observed when observing the coated surface of the steel sheet.

Thus, the "mottled-like tone" in the invention is a defect in coat layers resulting from the waviness due to the mutually penetrating upper and lower layers, which is observed in a cross section of stacked coat layers formed by multilayer simultaneous coating. In coat layers with "mottled-like tone", spots of color different from the surrounding color are observed when examining the surface of the stacked coat layers by the naked eye or a loupe. In other words, the "mottled-like tone" in the invention is a defect in coat layers, which is observed as spots of color different from the surrounding color when viewing the coat layer surface, which results from the portion of the lower layer penetrating into the upper layer approaching the surface of the upper layer, which leads to the relatively reduced thickness of the upper layer.

Further, the inventors learned that if the thickness of the coats as a whole becomes greater, mottled-like tone will easily occur. Specifically, they learned that if producing precoated steel sheet with a thickness of the coats after drying of 15 μm or more by multilayer simultaneous coating, mottled-like tone easily occurs.

The inventors studied whether these phenomena can be explained by the knowledge regarding conventional single layer coats.

With single layer coats, for example, a mottling phenomenon called "floating" has been reported. The reason why this floating occurs is that the evaporation of the solvent from the paint film after coating causes the surface layer to increase in viscosity and the temperature to drop, so the density and surface tension of the surface substance increase, the surface substance sink into the paint film, and the parts having a higher solvent content and lower surface tension rise from the inside of the paint film and spread at the surface to cause convection. This phenomenon is in general known as "Benard cell convection".

Therefore, the mottled-like tone phenomenon at the simultaneous multilayer coating differs from the floating phenomenon at a conventional single layer, but is a phenomenon occurring in the furnace, so there is a possibility of the convection in the coating film having an effect. Considering this, the inventors began their studies from the method of suppressing the convection.

As explained above, the phenomenon known as Benard cell convection at a single layer is a convection phenomenon where when the solvent unevenly volatilizes from the surface of the paint film, the surface tension or viscosity at that part increases, whereby a downward flow easily occurs at that part. This phenomenon is also known as Marangoni convection. It is known that Benard cell convection can be suppressed by adding a leveler, one type of surface adjusting agent, to the paint to suppress uneven evaporation of the solvent from the paint film.

Therefore, the inventors added a leveler to the upper layer paint among the paints for multilayer simultaneous coating so as to fabricate a precoated steel sheet and compared the extent of occurrence of mottled-like tone with a sheet in which a leveler is not added to the upper layer paint. As a result, they learned that by adding a leveler to the upper layer, the extent of mottled-like tone is improved compared with when not adding a leveler to the upper layer, but the state of occurrence becomes diverse.

Next, the inventors studied whether it is possible to adjust the surface tensions of the upper layer and lower layer paints under conditions of adding a leveler to the upper layer paint so as to prevent mottled-like tone. As a result, they discovered that if adjusting the difference of the surface tensions of the upper layer and lower layer paints to a certain range, it is possible to prevent mottled-like tone.

However, the fact that the difference of surface tensions can be used to prevent convection in the multilayer coating film cannot be explained from the mechanism of occurrence of Benard cell convection due to conventional Marangoni convection. Further, the phenomenon of Marangoni convection in the case of coating two or more different layers of paints was not known in the past.

Therefore, they considered the following hypothesis. For an upper layer paint to spread over a lower layer paint, from the balance of the forces of the interface, it is believed that the following equation must stand.

$$S=\sigma(\text{lower layer})-\sigma(\text{upper layer})-\gamma(\text{between upper layer and lower layer})>0$$

where, σ is the surface tension, and γ is the interfacial tension

Therefore, it is believed that the relationship $$\sigma(\text{lower layer})-\sigma(\text{upper layer})>\gamma(\text{between upper layer and lower layer})$$

is necessary. In other words, it is believed that if the surface tension of the lower layer is not larger than the surface tension of the upper layer by the amount of the interfacial tension, the upper layer paint will not spread over the lower layer paint. It is believed that the force by which the upper layer paint spreads wet works in a direction suppressing the force due to Marangoni convection disturbing the interface between the upper layer and lower layer and broadening the interface.

It is believed that the effect of suppressing mottled-like tone by adding a leveler as a surface adjusting agent to the upper layer of the multilayer paint film is due to uniformly reducing the surface tension of the upper layer and suppressing uneven evaporation of the solvent. As a result, this is believed to be similar to the effect of suppression of Benard cell convection at a conventional single layer paint film.

Further, as a new effect, it is believed that uniformly reducing the surface tension of the upper layer paint promotes the uniform spread of the upper layer paint on the lower layer paint, so acts in a direction uniformly suppressing the force disturbing the interface between the upper layer and lower layer and broadening the interface.

The inventors discovered that if introducing a leveler into not only the upper layer, but also the lower layer, when the surface tension of the upper layer is lower than the surface tension of the lower layer, there are conditions under which mottled-like tone will not occur even when the difference between the surface tension of the upper layer and the surface tension of the lower layer is small. This phenomenon is guessed to be that the lower layer paint easily spreads on the underlying layer (other paint layer formed together by multilayer simultaneous coating, steel sheet base, or primer layer on the same) and the phenomenon of the lower layer paint locally building up is suppressed.

In this way, in the present invention, it is important to adjust the surface tensions of the upper layer and lower layer paints. The surface tensions can be adjusted by utilizing a leveler, one type of surfactant.

In general, surfactants include levelers and defoamers. In particular, defoamers are being used to remove bubbles from coatings.

What is being used in the present invention to adjust the surface tensions is surfactants of the type called "levelers" used for improving the flatness of coats. Suitable levelers selected from among these by the following judgment are used. The suitable levelers and the amounts added are determined simply by whether orange peel like cissing occurs in the wet state when applying a paint to which an amount of leveler, required for adjustment of the surface tension of the paint has been added, in a single layer on a sufficiently wet sheet (a sheet where the paint layer does not become an orange peel like state-in the wet state when applying a paint to which no leveler has been added). A leveler not causing orange peel like cissing may be judged as a suitable leveler able to be used in the present invention.

As levelers actually able to be used, there are acryl-based levelers and silicone-based levelers. For example, as non-silicone-based types, Homogenol L18, Homogenol L95, and Homogenol L1820 (Kao Corporation), BYK057, BYK051, BYK052, BYK053, BYK055, BYK077 (BYK-Chemie), etc. and as silicone-based types, Homogenol L100 (Kao Corporation), BYK080, BYK141, BYK065, BYK066, BYK070, and BYK088 (BYK-Chemie), etc. may be mentioned.

The leveler in the coats of the precoated steel sheet produced by multilayer simultaneous coating can be detected by peeling off the coats of the product, extracting the unreacted polymer in a solvent, heating the solvent after extraction to concentrate the result, then analyzing the result by infrared spectrophotometric analysis.

Next, the results of study of the prevention of mottled-like tone of actual experiments will be explained with reference to the drawings. The mottled-like tone score was expressed using no mottled-like tone able to be seen as a score of 5 and mottled-like tone occurring to an extent able to be sufficiently confirmed visually as a score of 1 and dividing the interval between them into different extents of occurrence of mottled-like tone. For example, a score of 4 indicates mottled-like tone which cannot be clearly seen visually, but is of an extent which can be confirmed by viewing by a ×10 loupe.

FIG. 1 is a view of the effect on mottled-like tone when a leveler is not introduced to the lower layer coat and a leveler is introduced and not introduced into the upper layer coat. This shows the relationship between the difference of surface tensions (lower layer-upper layer) on the abscissa and the mottled-like tone score on the ordinate.

When the upper layer contains a leveler (shown by the black circles in FIG. 1), if the difference in surface tensions (lower layer-upper layer) becomes 1.2 mN/m or more, a mottled-like tone score of 5 was obtained. On the other hand, when the upper layer does not include a leveler (shown by triangles in FIG. 1), the difference in surface tensions between the lower layer and the upper layer can only be adjusted to about 1 mN/m and the mottled-like tone score varied from 2 to 4.

When the upper layer does not contain a leveler, the amount of adjustment of the difference in surface tensions between the lower layer and the upper layer is small, but compared with the case where the upper layer contains a leveler in this range, the case where the upper layer contains a leveler is relatively better in mottled-like tone score. The addition of a leveler to the upper layer improves the mottled-like tone.

Figure 2:
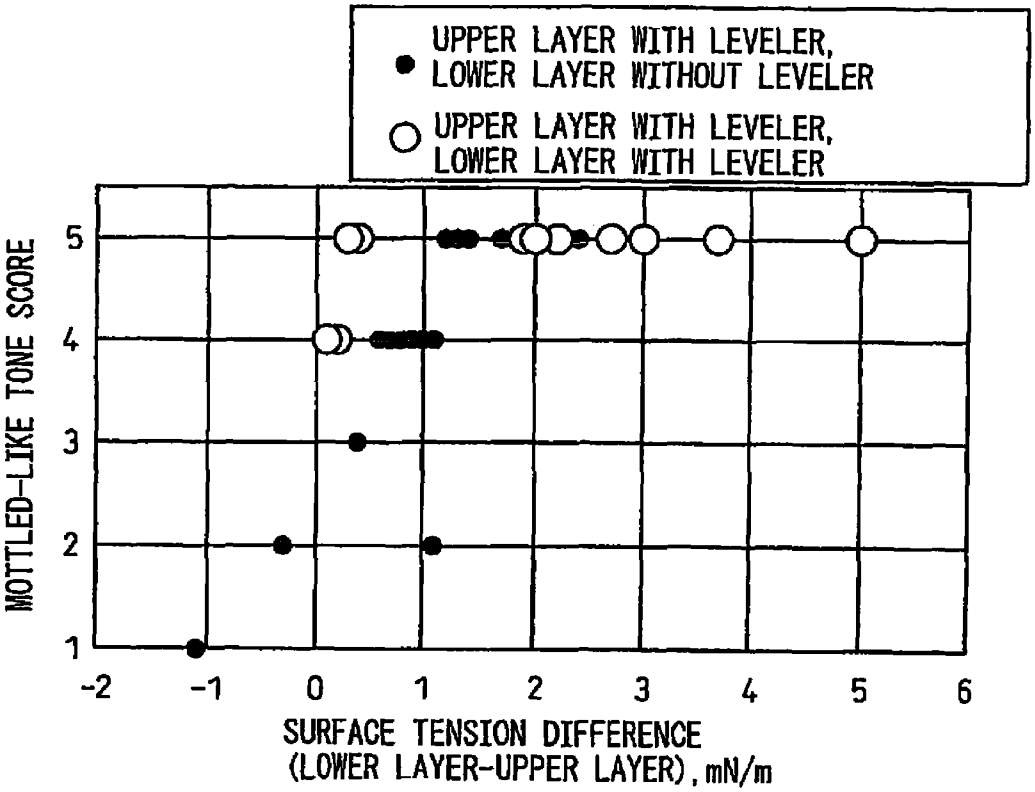
FIG. 2 is another view of the relationship between the difference in surface tensions of a lower layer and an upper layer and a mottled-like tone score.

FIG. 2 is a view of the effect on mottled-like tone when adding a leveler to the upper layer and adding and not adding a leveler to the lower layer. It shows the relationship between the two with the difference in surface tensions (lower layer-upper layer) on the abscissa and the mottled-like tone score on the ordinate.

When the upper layer and lower layer contain levelers (shown by white circles in FIG. 2), if the difference in surface tensions (lower layer-upper layer) becomes 0.3 mN/m or more, a mottled-like tone score of 5 is obtained. In this case, compared with the case where the upper layer contains a leveler and the lower layer does not include a leveler (shown by the black circles in FIG. 2), even if the difference in surface tensions is small, the mottled-like tone is improved.

Among the examples of FIGS. 1 and 2 where the upper layer includes a leveler but the lower layer does not include a leveler, there is an example where mottled-like tone of a score of 2 is seen when the difference of surface tensions is 1.1 mN/m. In this example, the amount of solvent added to the upper layer was increased and the surface tension of the upper layer was reduced, so the upper layer also fell in viscosity. Therefore, the first reason for the occurrence of mottled-like tone was mentioned to be the difference in surface tensions of the lower layer and upper layer being less than 1.2 mN/m, but as another reason, the effect of the drop in viscosity on the mottled-like tone may be considered. The viscosity of the upper layer measured by an Iwata cup in this example was 37 seconds. However, in another example, even though the difference in surface tensions of the lower layer and upper layer was less than 1.2 mN/m, when the viscosity of the upper layer was 59 seconds, the mottled-like tone score was 4. From this, it can be said that the higher the viscosity of the upper layer, the more the mottled-like tone is suppressed and that 60 seconds or more is desirable. Further, the tendency is seen for the viscosity of the lower layer as well that the higher the viscosity, the more mottled-like tone is suppressed.

As the paint of each layer used for the multilayer simultaneous coating in the present invention, it is important to use a paint giving a difference between the maximum value and minimum value of surface tension of less than 2 mN/m when measuring the surface tension five times. This is for the following reason. If micro unevenness occurs in the surface tension in a coating, this triggers the above-mentioned fine convection phenomenon in the coating layer in the heating process. Even if the average difference of the surface tensions of the upper and lower layers is suitable, mottled-like tone ends up occurring. Therefore, each coating used has to be a coating securing micro evenness of the surface tension.

A paint layer formed by a paint giving rise to micro unevenness of surface tension exhibits an orange peel like appearance as a result of the induced fine convection phenomenon. Whether such an orange peel appearance is exhibited can be simply judged as explained above by the appearance when applying a paint in a single layer to a sheet (micro uneven paint ending up with an orange peel appearance). The inventors discovered that as a standard for quantitatively judging this, the variation in values when measuring the surface tension several times is useful. That is, they learned that when measuring the surface tension five times, if the difference between the maximum value and the minimum value is less than 2 mN/m, the paint can be deemed sufficiently microscopically even.

Figure 3A:
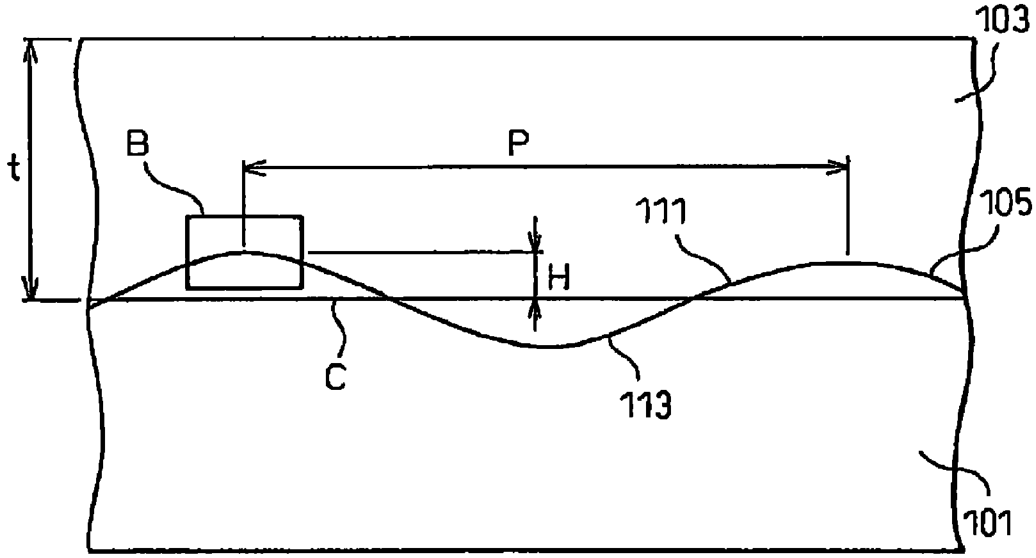
FIGS. 3A and 3B are views for explaining the interface of a lower coat layer and an upper coat layer of a precoated metal sheet according to the present invention.
Figure 3B:
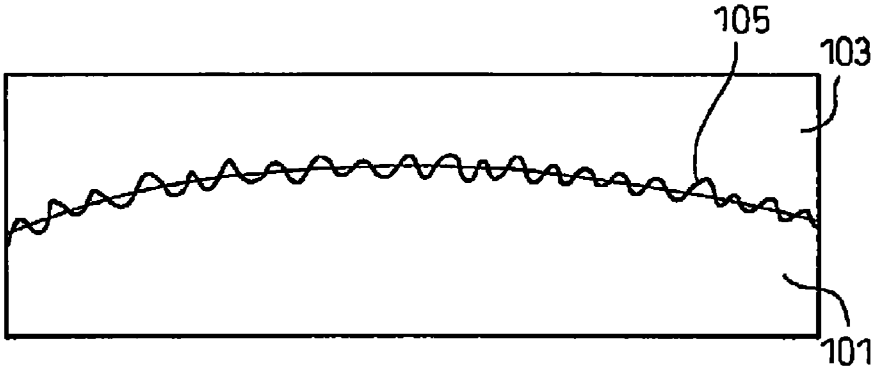

If examining the cross-section of the precoated steel sheet of the present invention produced by multilayer simultaneous coating under ×500, as shown schematically in FIG. 3A, waviness is observed in the interface 105 of the lower layer coat layer 101 and upper layer coat layer 103. In general, the pitch of the waviness (distance P in the drawing) is 0.5 to 1 mm or so. If examining the coat layer interface 105 by a further higher magnification of ×5000, fine roughness is observed at the interface as shown schematically in FIG. 3B corresponding to an enlarged view of the part shown by B in FIG. 3A.

Figure 4A:
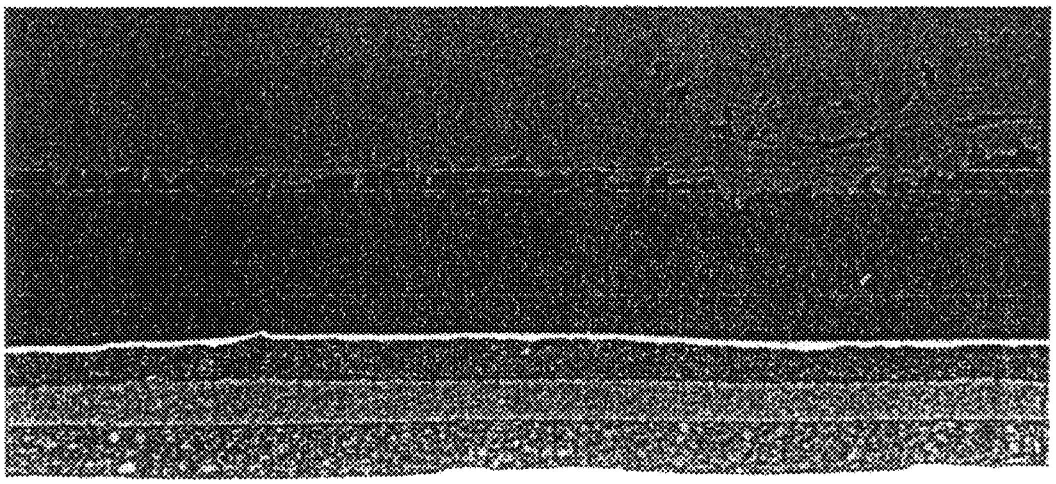
FIGS. 4A and 4B are scan type micrographs of the cross-section of coats of a precoated metal sheet according to the present invention.
Figure 4B:
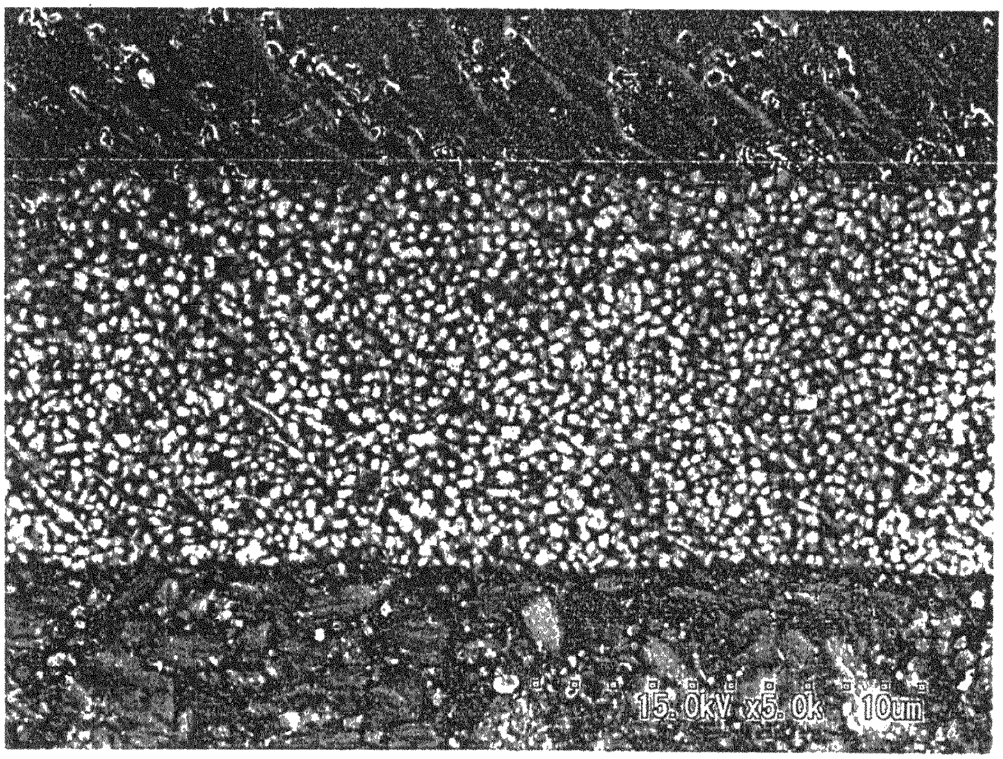

FIG. 4A and FIG. 4B are ×500 and ×5000 scan-type micrographs of cross-sections perpendicular to the surface of the coats obtained by cutting the coated steel sheet, embedding it in a resin, then smoothing it by polishing. The bottommost layer in the three layers seen at the center of FIG. 4A is the primer layer formed on the surface of the steel sheet. The two layers above them are layers of coats formed by multilayer simultaneous coating. It was observed that the interface between the upper and lower layers formed by multilayer simultaneous coating forms a gentle wavy shape. In FIG. 4B, the three layers are enlarged. The interface, seen at the center, between the lower layer of the coats of the multilayer simultaneous coating and the upper layer seen above it showed roughness finer than the waviness in FIG. 4A. The white spots in the lower layer of the coats of the multilayer simultaneous coating are particles of pigment added to the paint.

The fine roughness of the interface between the upper and lower coat layers formed by the multilayer simultaneous coating can be defined by finding the centerline average roughness Ra (JIS B 0601) used for expressing the surface roughness of a material. That is, it is possible to find the Ra by setting the curve of the interface 105 when viewed under ×5000 magnification as a roughness curve.

For example, it is possible to cut the coated steel sheet, embed it in a resin, then polish it to smooth the cross-section perpendicular to the surface of the coats, photograph this by a ×5000 scan type microscope, then find the Ra of the interface. Specifically, it is possible to cover the photo with a transparent sheet used for OHP, precisely trace the roughness of the interface, then measure the area of the part of the vertical lines as shown in FIG. 5 by an image processing system, and find the average value from the following equation:

$$Ra=(\int_0^l |f(x)|dx)/l$$

Figure 5:
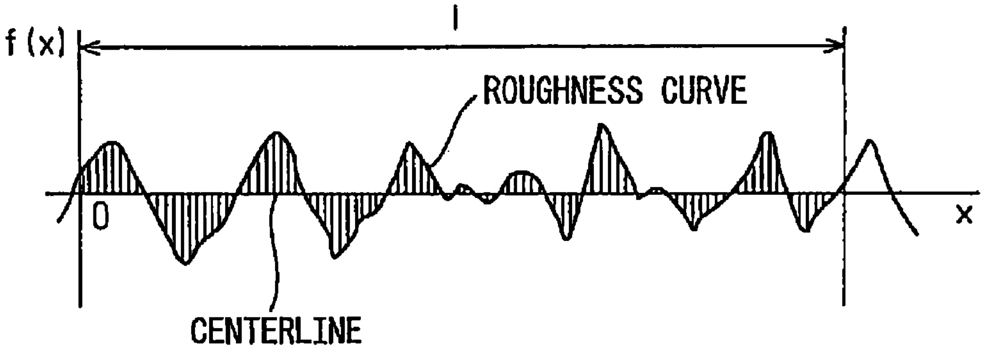
FIG. 5 is a view for explaining a method of evaluation of the Ra of a coat interface of a lower layer and upper layer.

In the equation, l is the measured length in the centerline direction shown in FIG. 5.

To further simply measure the Ra of the interface, it is also possible to cover the photograph by a transparent sheet as used for OHP, precisely trace the roughness of the interface, draw an average line corresponding to the centerline of FIG. 5, cut the transparent sheet along the roughness, measure the weights of the valley parts and peak parts above and below the average line, and convert the weights to average length to find the Ra.

By examining the roughness of the interface of the coat layers formed by multilayer simultaneous coating in this way, it was learned that the value of the centerline average roughness Ra is in general 0.3 μm or more and even at a minimum about 0.25 μm. It was learned that the upper limit was in general about 0.7 μm. This relationship is similarly observed even in three or more layers of coats formed by multilayer simultaneous coating. In this case, the centerline average roughness Ra of the interface between two adjoining layers observed under a high magnification of ×5000 also was generally 0.3 μm or more and at the lowest 0.25 μm or so. The upper limit was in general 0.7 μm or so. On the other hand, in the case of multilayer coats comprised of coat layers formed by the conventional single layer coating method superposed on each other, the Ra of the interface is 0.15 to 0.25 μm or so. If examining this by a ×5000 micrograph, the difference from the coat layer according to the present invention is clear.

The waviness of the interface between the upper and lower coat layers as observed by a ×500 low magnification enlarged photograph of the cross-section of the precoated steel sheet of the present invention produced by multilayer simultaneous coating is believed to be due to these paint films both being in the undried liquid state right after application as a result of application of the two layers of paint superposed in the wet state. By studying the interface with this waviness, it was learned that if the maximum height H measured from the centerline C of the peaks 111 and valleys 113 of the waviness of the interface 105 shown in FIG. 3A is over 50% of the thickness t of the upper layer expressed as the distance from the centerline C to the top surface of the upper layer, mottled-like tone can be observed. In three or more layers of coats formed by multilayer simultaneous coating, it is essential that this relationship be satisfied between the layer positioned at the topmost layer in the colored layers and the lower layer adjoining this. It is preferable that in three or more layers of coats, a similar relationship be satisfied between the clear top coat layer formed together by multilayer simultaneous coating on the layer positioned at the topmost layer in the colored layers and the colored layer below it.

In the present invention, the thickness t expressed as the distance from the centerline of the interface with waviness to the top surface of the upper layer is made the average thickness of the upper layer. Similarly, the thickness expressed as the distance from the bottom surface of the lower layer to the centerline of the interface with the upper layer is made the average thickness of the lower layer. The average thickness of the intermediate layers other than the topmost layer and bottommost layer in the case where the coats formed by the multilayer simultaneous coating are comprised of three or more layers is found as the distance between the centerlines at the interfaces with the upper and lower layers with waviness.

Figure 6:
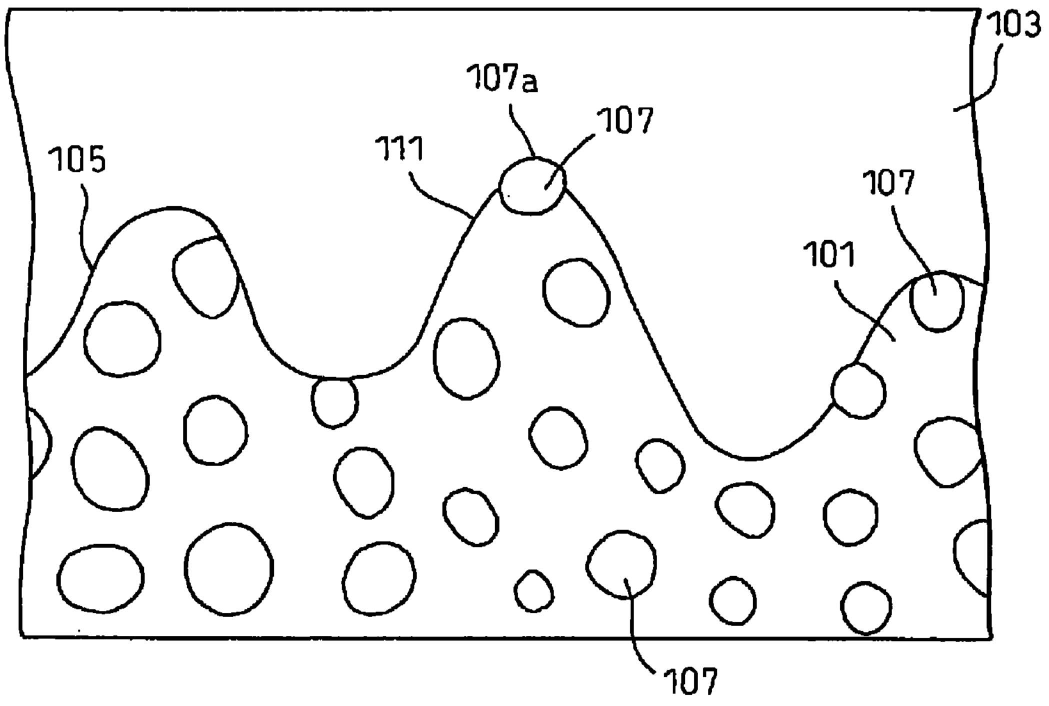
FIG. 6 is a view for explaining an interface in the case where the lower layer includes a pigment.

As shown in FIG. 6, when the lower layer 101 includes the pigment 107 and part of the pigment 107 is present at the parts of the peaks 111 of the interface 105 with waviness, the top part of the pigment 107 sometimes contacts the interface 111 or sticks out from the interface 111 into the upper layer 103. The above maximum height H when the pigment 107 sticks out from the interface 111 is determined by viewing the contour 107*a* of the part of the pigment 107 sticking out from the interface 111 as the interface.

Next, the adhesion between coats is evaluated by examining the presence of any peeling of the interfaces by the usual coin scratch test method. By examining the relationship between the evaluated adhesion between the coats and the roughness of the interface measured by the Ra, it was learned that in a sample with an Ra of the interface of less than 0.3 μm, the adhesion between coats was inferior. That is, even with coats of simultaneous multilayer coating, if the Ra of the interface is less than 0.3 μm, the adhesion between coats became substantially the same as that of multilayer coats obtained by stacking conventional single layer coats prepared by the same paints. Both when introducing the leveler into only the upper layer and when adding the leveler to both the upper layer and lower layer, if the Ra is less than 0.3 μm, it was learned that the adhesion is no longer good.

Further, the inventors investigated the relationship between the difference in surface tensions of the lower layer and upper layer and the roughness of the coat interface as expressed by Ra, whereupon they learned that if the difference in surface tensions of the lower layer and upper layer becomes larger, the indicator Ra of the roughness of the coat interface becomes smaller. Further, the difference in surface tensions of the lower layer and upper layer when the Ra of the interface becomes less than 0.3 μm was observed to be 5 mN/m or more when introducing the leveler into only the upper layer and 3.7 mN/m or more when adding the leveler to both the upper layer and lower layer.

As explained above, as a condition for preventing mottled-like tone and obtaining a score of 5, the difference in surface tensions of the lower layer and upper layer has to be 1.2 mN/m or more when introducing the leveler into only the upper layer and 0.3 mN/m or more when adding the leveler to both the upper layer and lower layer.

Therefore, when introducing the leveler into only the upper layer, making the difference in surface tensions of the lower layer and upper layer 1.2 mN/m to less than 5 mN/m was made a condition for being able to achieve both prevention of mottled-like tone and adhesion. Further, when adding the leveler to both the upper layer and lower layer, making the difference in surface tensions of the lower layer and upper layer 0.3 mN/m to less than 3.7 mN/m was made a condition for being able to achieve both prevention of mottled-like tone and adhesion.

The coats of the precoated metal sheet of the present invention are formed using a multilayer simultaneous coating system. A schematic view of a representative type of such a system as constituted by a slide hopper type curtain coating system is shown in FIG. 7.

Figure 7:
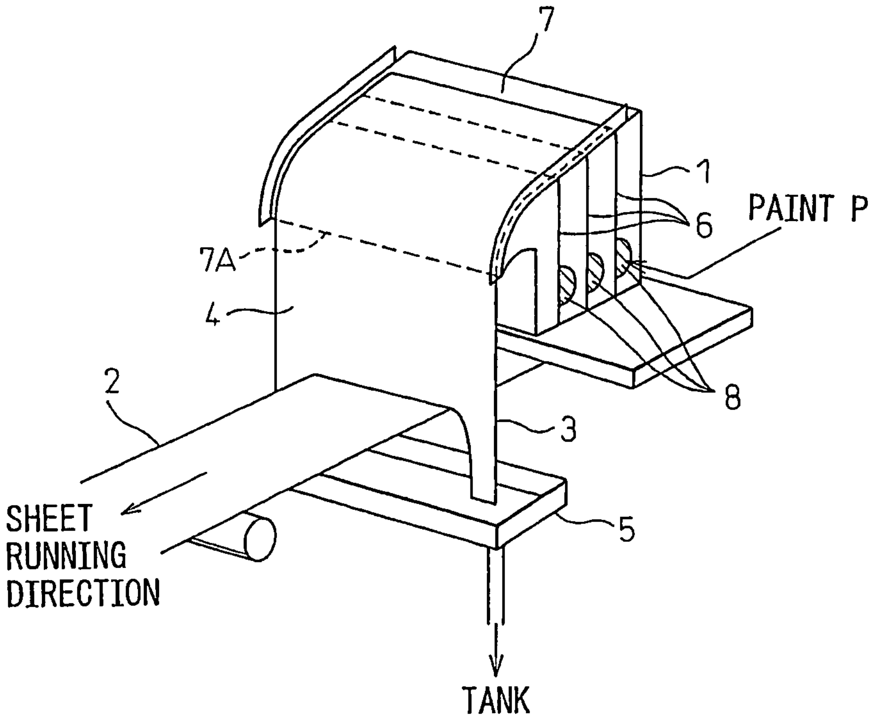
FIG. 7 is a schematic perspective view of a slide hopper type curtain coating system.

Referring to FIG. 7, a slide hopper 1 is provided with paint feed ports 8 and slits 6 from which three layers of paints are quantitatively fed out by a gear pump (not shown). A chain like curtain guide 3 is provided so as to contact the two ends of the lip part 7A of the slide surface 7. Below the lip part 7A, a paint pan 5 is provided. The curtain guide 3 hangs down to the bottom of the coating pan 5. The paint P is supplied from the paint feed ports 8 of the slide hopper 1 through the slits 6 to the slide surface 7 uniformly in the width direction and is laid on the slide surface 7. When laid paint drop down from the front end (lip part 7A) of the slide surface 7 to the paint pan 5, it is spread by the curtain guide 3, so flows down as a liquid film uniform in the width direction as a curtain 4 of the paint. By passing a strip like metal sheet, for example steel strip 2, through this liquid film, it is possible to simultaneously coat a plurality of layers of paint on the surface of the steel strip 2.

If using a slide hopper type curtain coating system, since a plurality of layers are simultaneously coated without contact with the surface of the metal sheet, there is none of the ridging which cannot be avoided with a roll coater. Further, since the coat film is made of a plurality of layers of curtains 4, so long as the total thickness of the curtains 4 is a stable thickness or more, that is, about 20 μm in terms of dried thickness, it is possible to coat a thickness of a single layer of paint of several μm. Therefore, by simultaneously coating the lower layer coat and the upper layer coat, it is possible to obtain a coated metal sheet with a beautiful appearance free of any ridging.

Further, by making the surface tension of the upper layer paint lower than the surface tension of the lower layer paint, the upper paint film will become smooth. This is because when the surface tension of the upper layer paint is lower than that of the lower layer paint, since the lower layer paint is constrained by the surface of the metal sheet, a smoother surfacemost paint is stabler, by the laws of fluid dynamics.

In precoated steel sheet preventing mottled-like tone and improved in adhesion of the present invention, it is possible to use any paint so long as the above conditions are satisfied. For example, in the paint for forming the lower layer coat of the precoated steel sheet, as the resin ingredient forming the coat, it is possible to suitably use a polyester based resin. In addition to this, the paint of the lower layer may also include various ingredients generally used in paint compositions. For example, a melamine resin-based, isocyanate-based, or other known curing agent may be used. The lower layer paint may also contain, in accordance with need, an extender pigment, aggregate, etc. As the solvent of the coating, a hydrocarbon-based one, Anone/Sorbesso (1:1 mixed solvent of cyclohexanone (usually called Anone) and Sorbesso 150), etc. may be used.

In the upper layer paint as well, as the resin ingredient forming the coat, again a polyester based resin may be used. In addition, for example, a fluorine-based, acryl-based, silicone polyester-based, urethane-based, epoxy-based, or other resin ingredient may be used. The upper layer paint may include, in addition to the polyester-based resin of the main resin, a melamine resin-based, isocyanate-based, or other known curing agent. Again, in addition, in accordance with need, an extender pigment, defoamer, wax, etc. may be included. In the upper layer paint, a general hydrocarbon-based solvent is used.

As the coloring pigment in the precoated metal sheet of the present invention, it is possible to use any pigment selected from known coloring pigments. Listing representative examples of coloring pigments, there are organic pigments such as Azo Yellow, Isoindoline Yellow, Azo Red, Phthalocyanine Blue, Suren Blue, Quinacridone Red, etc. and inorganic pigments such as carbon black, red oxide, yellow lead, Molybdate Orange, Titanium White, Ultramarine Blue, Prussian Blue, Titanium Yellow, graphite, zinc white, etc.

For drying and baking the paint, for example, a hot air oven, induction furnace, near infrared furnace, far infrared furnace, or energy beam curing furnace may be used. From the viewpoint of the balance between the evaporation of the solvent due to heating or curing of the paint and the deterioration of the resin ingredient in the paint, the baking temperature of the paint is preferably 150° C. to less than 320° C.

In the top clear type precoated metal sheet superior in weather resistance of the present invention, the upper layer of the coat layer is a transparent or semitransparent clear layer, and the centerline average roughness Ra of the interface between the lower coat layer adjoining the upper clear layer and the upper clear layer is 0.3 to 0.7 μm. Further, the Ra of the interface of 0.3 to 0.5 μm is preferable in giving a feeling of weight to the appearance.

In the top clear type precoated metal sheet of the present invention, the interface Ra can be adjusted as explained earlier utilizing a leveler (a type of surfactant) to control the difference in surface tensions between the upper layer and lower layer. The leveler able to be used for this was as explained before. Again, as explained earlier, it is believed that by the surface tension of the lower layer being larger than the surface tension of the upper layer by the amount of the interfacial tension, the upper layer paint easily spreads on the lower layer paint, the force disturbing the interface between the upper layer and lower layer due to Marangoni convection and broadening the interface is suppressed, and abnormal disturbance of the interface accompanying application of the paints of the upper and lower coats in the liquid state is suppressed.

As already explained, regarding the relationship between the difference in surface tensions of the lower layer and upper layer and the fine roughness at the interface of the coat layers (centerline average roughness Ra), it was learned that as the difference in surface tensions of the lower layer and the upper layer becomes larger, the Ra indicator of the roughness at the interface of the coats becomes smaller. The difference in surface tensions between the lower layer and the upper layer when the Ra of the interface is less than 0.3 μm was 5 mN/m or more when introducing the leveler into only the upper layer and was 3.7 mN/m or more when introducing the leveler to the upper layer and the lower layer. Therefore, in the present invention, to achieve an Ra of 0.3 μm or more at the interface of the upper layer and lower layer, it is sufficient to make the difference in surface tension between the lower layer and upper layer less than 5 mN/m when introducing the leveler to only the upper layer and to less than 3.7 mN/m when introducing the leveler to both the upper layer and the lower layer.

The surface tension and Ra of the interface mentioned here may be measured by the methods explained above.

The top clear type precoated metal sheet of the present invention is a precoated metal sheet giving a color, pattern, design, etc. to the upper clear layer so that the color, pattern, design, etc. of the base coat can be seen and thereby impart a design nature rich in variety by a synergistic effect between the lower coat layer and upper clear layer. Since the upper clear layer is transparent (clear) to an extent enabling the lower coat layer to be seen through the upper clear layer (top coat), it is called a "top clear type". The lower coat layer is not particularly limited in color, pattern, or design and may be obtained using any one or combination of known techniques.

To give the top clear layer a synergistic effect with the lower coat as explained above, it is necessary that the color, pattern, design, etc. of at least the substrate be visible through the top clear layer. If satisfying this condition, it is possible to use a pigment, dye, aggregate, or delustering agent or other known technique used for paints to give the top clear layer a color, pattern, or design. That is, the top clear layer need only have a transparency of an extent where the color etc. of the lower coat layer is substantively reflected in the appearance of the coated metal sheet (that is, may also be semitransparent).

Further, an additive for imparting lubrication, stain resistance, or other functions, an additive for improving the paint work, the dispersion stability of the pigment etc., etc., a UV absorbent for improving the UV resistance, an antioxidant, or another additive or another ingredient may be added to the top clear layer. Needless to say, it is also possible not to blend any pigment etc. in the top clear layer and secure a completely clear state.

It is further possible to form a coat layer over this top clear layer so as to protect this top clear layer or further obtain a synergistic effect by multiple layers. In this case as well, it is necessary that the lower layer coat be visible through the superposed coat.

In the top clear type precoated metal sheet of the present invention, when the base metal sheet is steel sheet, for example, stainless steel sheet and plated steel sheet may be suitably used. As stainless steel sheet, ferritic stainless steel sheet, martensitic stainless steel sheet, austenitic stainless steel sheet, etc. may be mentioned. As plated steel sheet, galvanized steel sheet, zinc-iron alloy plated steel sheet, zinc-nickel alloy plated steel sheet, zinc-chrome alloy plated steel sheet, zinc-aluminum alloy plated steel sheet, aluminum-silicon alloy plated steel sheet, zinc-aluminum-magnesium alloy plated steel sheet, zinc-aluminum-magnesium-silicon alloy plated steel sheet, zinc-plated stainless steel sheet, aluminum-plated stainless steel sheet, etc. may be mentioned.

As the treatment before coating of the steel sheet, there are cold water washing, hot water washing, pickling, alkali degreasing, grinding, polishing, etc. It is possible to perform these alone or in combination in accordance with need. The conditions of the treatment before coating also may be suitably selected. Before coating the enamel base coat, it is also possible to conversion-treat the surface in accordance with need. It is also possible to provide a primer layer having a rust preventing pigment on the conversion-treated layer and provide an enamel base coat thereon. That is, it is also possible to provide a top clear type precoated steel sheet of a three-layer structure of an undercoat layer, enamel pigment-containing midcoat layer, and topcoat (clear) layer.

The upper clear layer is a transparent or semitransparent clear layer. The paint for forming the upper clear layer is not particularly limited, but for example a polyester, acryl, silicone, fluorine, urethane, or olefin type or mixtures or copolymers of the same may be suitably used.

The paint of the upper clear layer may also contain, in accordance with need, a cross-linking agent such as an amino resin, isocyanate resin, epoxy resin, or other known agent. Further, as explained above, it is also possible to include a pigment or other coloring agent within a range where the lower layer can be seen.

Further, in accordance with need, it is also possible to utilize an upper clear layer described in JP 2003-326639 A or JP 10-193509 A.

For example, the coating for the upper clear layer may also have added to it, within a range not impairing the transparency and for the purpose of imparting the design property, pearl, mica, metal powder (aluminum powder, nickel powder, stainless steel powder, etc.), organic enamel beads (urethane resin beads, acryl resin beads, etc.), or coloring pigments or dyes.

In the present invention, the coats to be formed on the metal sheet include at least the above-mentioned transparent or semitransparent upper clear layer and lower coat layer adjoining that upper clear layer. In accordance with need, it may also include layers other than these upper clear layer and lower coat layer (for example, a layer between the lower coat layer and metal sheet).

The paint for forming the lower coat layer is not particularly limited, but for example a polyester, acryl, silicone, fluorine, urethane, or olefin types or mixtures or copolymers of the same may be suitably used.

The paint of the lower coat layer may also contain, in accordance with need, a cross-linking agent such as an amino resin, isocyanate resin, epoxy resin, or other known agent. The lower coat layer preferably contains a pigment or other coloring agent (for example, when there is a still other coat between the lower coat layer and the metal sheet). Further, an additive for imparting lubrication, stain resistance, or another function, an additive for improving the painting work efficiency, the dispersion stability of the pigment etc., a UV absorbent for improving the UV resistance, an antioxidant, or other additive or other ingredient may also be added to the lower layer.

Further, in accordance with need, it is also possible to utilize a material for the lower coat layer described in JP 2003-326639 A or JP 10-193509 A.

For example, as the "enamel base coat" forming one embodiment of the lower coat layer in the present invention, it is possible to use an enamel base coat or precoated steel sheet commonly used as it is.

As an enamel base coat, a polyester resin-based base coat, acryl resin-based base coat, silicone polyester resin-based base coat, PET resin-based base coat, urethane resin-based base coat, polyvinyl chloride resin-based base coat, fluorine resin-based base coat, etc. may be mentioned. When further superior weather resistance is necessary, it is possible to use a resin the same as that used for the clear paint of the present invention for the base coat coating. That is, this may be achieved using an enamel base coat paint obtained by blending into a copolymerized acryl polyol obtained by copolymerizing one or both of a polymerizable UV stable monomer and cycloalkyl group-containing polymerizable monomer and a polymerizable monomer ingredient essentially including a hydroxy-group containing polymerizable monomer a cross-linking agent comprised of an aminoplast resin or polyisocyanate compound, and dissolving or dispersing the blend in a solvent. Further, by adding a UV stabilizer, it is possible to impart further superior weather resistance. As a UV stabilizer, as explained above, a benzophenone-based, benzotriazole-based, anilide succinate-based, cyanoacrylate-based, triazine-based, or other stabilizer may be used. These may be used as additive or may be used in a form chemically bonded with the resins of the present invention.

The top clear type precoated metal sheet of the present invention is produced by simultaneously coating at least one surface of a metal sheet with a lower layer coat layer (for example, an enamel base coat) and a coat layer of a clear paint utilizing a multilayer simultaneous coating system and then drying and baking the same. The paints may be dried and baked by heating utilizing a hot air oven, induction furnace, near infrared furnace, far infrared furnace, or energy beam curing furnace. From the viewpoint of the balance of the evaporation of the solvent or curing of the paints and the deterioration of the resin ingredient in the paints (appearance and workability as precoated metal sheet), the baking temperature of the paints is preferably 150° C. to less than 320° C.

In the top clear type precoated metal sheet of the present invention, so long as the coats arranged on the metal sheet include at least an upper clear layer and lower coat layer and the centerline average roughness Ra of the interface between the upper clear layer and lower coat layer is 0.3 to 0.7 μm, there may be three or more layers of coats.

The thicknesses of the coated films of the top clear type precoated metal sheet of the present invention are not particularly limited. That is, the suitable thicknesses may also differ depending on the coat performance or applications, so these are preferably selected discretionally. However, this being said, in general, the thickness of the enamel base coat is preferably 5 μm to 40 μm or so, while the thickness of the clear coat layer is preferably 1 to 40 μm.

In the present invention, when including a curing agent (for example, a melamine resin) in all or part of the coats including at least the two layers of the lower coat layer and upper clear layer, it is possible to introduce into each individual coat a curing agent for the resin forming that coat.

Further, in the present invention, it is also possible to include a curing agent for another coat in the coats in addition to or in place of the curing agent for the resins forming the coats. That is, in the present invention, for example, it is possible to combine a curable resin and a curing agent as follows (in the following table, the curing agent for the resin A being referred to as "a", the curing agent for the resin B as "b", and the curing agent for the resins A and B in common as "c").

| Lower coat layer | Curing agent contained in lower layer | Upper clear layer | Curing agent contained in upper layer |
|---|---|---|---|
| (1) Resin A | Curing agent a | Resin B | Curing agent b |
| (2) Resin A | Curing agent c | Resin B | None |
| (3) Resin A | None | Resin B | Curing agent c |
| (4) Resin A | Curing agent c | Resin B | Curing agent c |

When adding a curing agent reacting with a paint resin of another layer to one or both of the upper clear layer and lower coat layer, it is possible to further improve the adhesion between layers based on the mutual dispersion of the curing agent (for example, melamine resin) at the interface of the upper clear layer/lower coat layer.

In the present invention, using the above method (or any other method) to provide a gradient of concentration of the curing agent at least at the part in the vicinity of the interface of the lower coat layer and upper clear layer is preferable from the viewpoint of further improving the adhesion between these layers. This is also preferable from the viewpoint that the presence of a gradient of concentration of the curing agent at the part in the vicinity of the interface results in a change of the refractive index of light in the vicinity of the interface and a further increase in the ratio of the irregular reflection at the interface.

The precoated metal sheet achieving both workability and corrosion resistance of the present invention is characterized by having a lower coat layer and an upper coat layer thereon formed on the metal sheet by multilayer simultaneous coating, wherein the lower coat layer contains an average 30 wt % or more of a rust preventing pigment, the upper coat layer contains a rust preventing pigment the same as the rust preventing pigment in the lower layer coat by an average content lower than the average content of the lower coat layer and by a concentration gradient gradually decreasing the further from the vicinity of the interface with the lower coat layer, and the centerline average roughness Ra at the interface between the lower coat layer and upper coat layer is 0.3 to 0.7 μm.

The paint forming the lower coat layer of the precoated steel sheet contains a resin ingredient for forming a coat and a rust preventing pigment effective for suppression of corrosion of the steel sheet. As the resin ingredient for forming the coat, it is possible to suitably use a polyester-based resin. The paint of the lower coat layer may also include various ingredients generally used in paint compositions. For example, it is possible to use a melamine resin-based, isocyanate-based, or other known curing agent. The paint of the lower coat layer may also contain in accordance with need an extender pigment or aggregate and further may contain titanium white etc. as the coloring pigment. As the solvent of the paint, it is possible to use the hydrocarbon-based Anone/Sorbesso (1:1 mixed solvent of cyclohexanone (usually known as Anone) and Sorbesso 150) etc. The ratio of mixture of the main resin and the other ingredients may be suitably determined by the coating conditions of the paints, the requirements of the coats formed, etc. For example, when using a melamine resin-based curing agent, it is possible to use 5 to 40 parts by mass of the curing agent with respect to 100 parts by mass of the main resin. Further, the solvent may be used in an amount of 50 to 200 parts by mass and the rust preventing pigment in an amount of 20 to 100 parts by mass with respect to 100 parts by mass of the main resin.

Typical examples of the rust preventing pigment contained in the lower coat layer of the precoated steel sheet according to the present invention include chromate-based compounds such as strontium chromate and barium chromate, and non-chrome-based rust preventing pigments such as calcium silicate, and phosphate-based compounds, and the like.

In the paint forming the upper coat layer as well, it is possible to use, as the resin ingredient forming the coat, a polyester-based resin similar to that explained previously for a paint forming the lower coat layer. In addition, for example, it is also possible to use a fluorine-based, acryl-based, silicone polyester-based, urethane-based, epoxy-based, or other resin ingredient. The paint forming the upper coat layer may also include, in addition to the polyester-based resin of the main resin, a melamine resin-based, isocyanate-based, or other known curing agent. In addition, the paint of the upper layer coat may also include in accordance with need an extender pigment, defoamer, leverer, wax, etc. In the paint of the upper coat layer, in general a hydrocarbon-based solvent is used. The ratio between the main resin and the other ingredients may be suitably determined in accordance with the conditions of application of the paint, the requirements of the coat formed, etc. For example, when using a melamine resin-based curing agent, it is possible to use 5 to 100 parts by mass of a curing agent with respect to 100 parts by mass of the main resin. Further, it is also possible to use a solvent in an amount of 50 to 200 parts by mass and a wax in an amount of 0.5 to 5 parts by mass with respect to 100 parts by mass of the main resin.

The above-mentioned ingredients of the paint used in the precoated steel sheet achieving both workability and corrosion resistance according to the present invention are all widely known and are not special.

In the precoated metal sheet achieving both the workability and corrosion resistance of the present invention, the lower coat layer contains an average of 30 wt % or more of a rust preventing pigment, the upper coat layer contains the same rust preventing pigment as the rust preventing pigment in the lower coat layer by an average content lower than the average content of the lower coat layer and by a concentration gradient gradually decreasing the further from the vicinity of the interface with the lower coat layer. The rust preventing pigment in the upper coat layer is mainly present near the interface with the lower coat layer and should not be detected at the surface of the upper coat layer. If the rust preventing pigment is present at the surfacemost layer of the coated metal sheet, the stain resistance, workability, appearance, and color tone become poor.

The lower coat layer and upper coat layer in the precoated metal sheet achieving both workability and corrosion resistance of the present invention can be formed by including in the paint for the lower layer formed on the metal sheet a greater amount of rust preventing pigment than the average content of rust preventing pigment targeted in the lower layer of the completed coated metal sheet and using the heat when baking the paint film for the lower layer and the paint film for the upper layer on the metal sheet after coating so as to cause the rust preventing pigment in the lower layer to disperse to the upper layer. The amount of the rust preventing pigment to be initially included in the paint for the lower layer can be simply determined through experiments based on the target content of the rust preventing pigment in the lower layer of the precoated metal sheet, the baking conditions, etc.

The average content of the rust preventing pigment in the lower coat layer of the precoated metal sheet is at least 30 wt %. When less than 30 wt %, the precoated metal sheet is no longer sufficiently improved in the corrosion resistance. Preferably, the average content of the rust preventing pigment content in the lower coat layer is 50 wt % or more. When introducing the rust preventing pigment in the lower coat layer, conventionally the upper limit of the rust preventing pigment content is about 40 wt %. The reason is that even if increasing the rust preventing pigment more than that, the effect ends up being saturated. Further, if increasing the amount of the rust preventing pigment, the lower coat layer becomes brittle and no improvement in the corrosion resistance can be expected any longer. However, in the precoated metal sheet of the present invention, due to the effect of the continuity of the distribution of hardness in the thickness direction of the coat explained later, it is possible to raise the corrosion resistance in accordance with the content of the rust preventing pigment in the lower coat layer even if the lower coat layer becomes brittle.

In a precoated metal sheet of the present invention achieving both workability and corrosion resistance, it is also important that the centerline average roughness Ra of the interface between the lower coat layer and upper coat layer be 0.3 to 0.7 μm (the Ra being measured as explained above). By making the Ra of the interface this range, the adhesion of the upper coat layer and lower coat layer can be secured and the workability of the coat layers can be improved. If the Ra of the interface is less than 0.3 μm, the adhesion between the upper coat layer and the lower coat layer is insufficient and the workability of the coat layers is impaired. The upper limit of 0.7 μm is the upper limit of Ra usually observed at adjoining layers of multilayer simultaneous coating.

The centerline average roughness Ra in the above range of the interface between the lower coat layer and upper coat layer can be obtained by utilizing the method of using, for example, a slide coater or other coater able to simultaneously form two or more layers of coats to simultaneously coat upper layer and lower layer paint films on the metal sheet and then simultaneously baking them. A slide coater has the slide surface where the discharge port of the paint is located and the metal sheet in the form of a coated strip separated from each other, so the paint films are resistant to the effects of the discharge flow of the paints and enable the thickness of the coat layers in the width direction and the state of Ra to be maintained uniform. As explained earlier, the Ra of the coat layer interface can be controlled by utilizing the difference in surface tensions of the paints forming the upper and lower coat layers. The surface tension of a paint is determined from the ingredients and composition of the paint, so it is possible to adjust these to adjust the Ra of the interface. This being said, as explained above, it is preferable to utilize a leveler additive to adjust the Ra of the interface.

In this way, the precoated metal sheet of the present invention achieving both workability and corrosion resistance can be produced by the method of making part of the rust preventing pigment in a lower coat layer disperse in an upper coat layer when baking a paint film comprised of a lower coat layer containing a rust preventing pigment coated on the surface of a metal sheet and an upper coat layer thereon using a multilayer simultaneous coating system, wherein the average concentration of the rust preventing pigment in the lower layer formed by baking becomes 30 wt % or more, the upper layer contains a rust preventing pigment the same as the rust preventing pigment of the lower layer by an average content lower than the average content of the lower layer and by a concentration gradient gradually decreasing the further from the vicinity of the interface with the lower layer, a leveler is added to the upper coat layer or the upper coat layer and lower coat layer, and a centerline average roughness Ra of the interface between the lower coat layer and upper coat layer becomes 0.3 to 0.7 μm.

Figure 8:
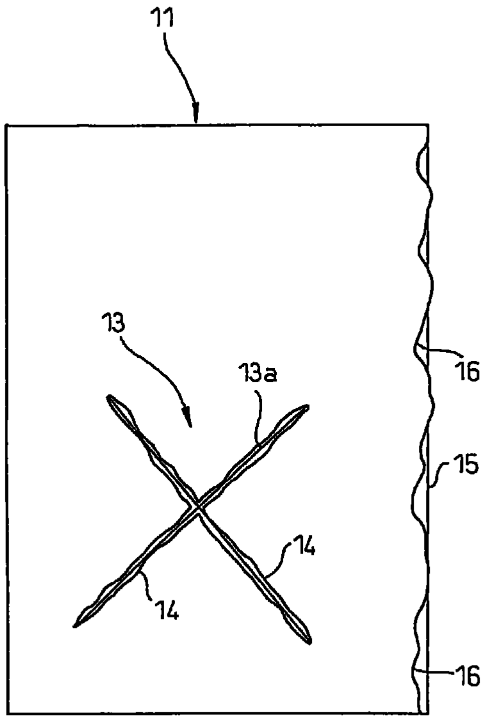
FIG. 8 is a view for explaining a sample of a coated metal sheet subjected to a saltwater spray test (SST).

In general, if subjecting a sample of a precoated metal sheet provided with an upper coat layer and a lower coat layer to a saltwater spray test (SST), in a sample inferior in corrosion resistance, as shown in FIG. 8, blisters 14 and 16 due to the saltwater invading the interface between the upper coat layer and the lower coat layer are observed in the region in the cross-cut part 13 of the coating of the sample 11 of an extent of a width of 1 mm or so from the cross-cut line 13*a* along the line 13*a* and the region of an extent of a width of 5 mm or so from the end face. This blistering is believed to occur due to the following mechanism.

Figure 9:
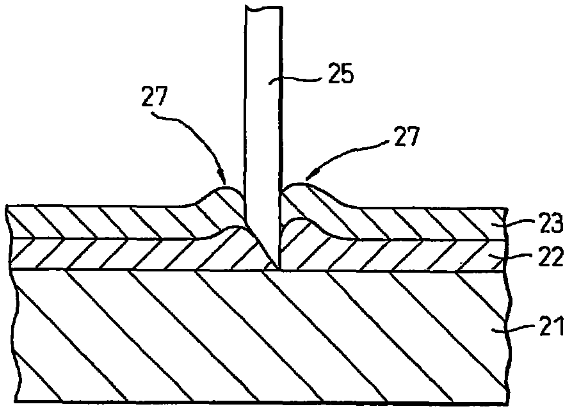
FIG. 9 is a view for explaining a cross-cut part of a sample of a coated metal sheet subjected to a saltwater spray test.
Figure 10:
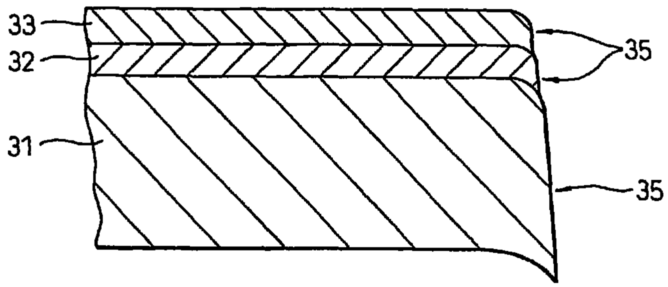
FIG. 10 is a view for explaining an end face of a sample of a coated metal sheet subjected to a saltwater spray test.

At the cross-cut part, as shown in FIG. 9, when making a cut into the lower coat layer 22 on the metal sheet 21 and the upper coat layer 23 by a knife 25, strain parts 27 as illustrated occur in the lower coat layer 22 and upper coat layer 23. On the other hand, at the end faces of the precoated metal sheet, as shown in FIG. 10, the illustrated strain parts 35 occur in the lower coat layer 32 and the upper coat layer 33 on the metal sheet 31 at the time of cutting the precoated metal sheet. After this, the lower coat layer 22 and upper coat layer 23 of the cross-cut part and the lower coat layer 32 and the upper coat layer 33 of the end faces return to their original strain-free states. At this time, if the adhesions between the lower coat layers 22, 32 and the upper coat layers 23, 33 are good, saltwater does not easily penetrate at the interface of the two layers and corrosion resistance is secured, but when the adhesion of the two layers is poor, saltwater penetrates through their interface to cause blisters of the coat layers, that is, the precoated metal sheet exhibits insufficient corrosion resistance.

In the precoated metal sheet of the present invention, by introducing a 30 wt % or more relatively high content of rust preventing pigment into the lower coat layer, expression of the corrosion resistance by the lower coat layer is secured. On the other hand, by making the upper coat layer also include the rust preventing pigment dispersed from the lower coat layer in the production process by a suitable concentration gradient and making the centerline average roughness Ra of the interface between the lower coat layer and upper coat layer 0.3 to 0.7 μm, the adhesion of the upper coat layer and lower coat layer is improved and thereby the workability of the metal sheet is secured and the drop in corrosion resistance due to permeation of moisture at the interface between the lower coat layer and upper coat layer is prevented.

In general, the coatings of a two-layer structure of a precoated metal sheet are formed so that the upper layer is hard and the lower layer is soft. If including in the upper layer of the coating formed by baking two layers of paints a rust preventing pigment the same as that of the lower layer by a suitable concentration gradient, the distribution of the hardness in the thickness direction of the coating becomes continuous (or substantially continuous). Due to this, at the lower layer, which is inherently soft and becomes brittle due to the inclusion of the rust preventing pigment and so is susceptible to cracks, the cracks occurring at the time of working the metal sheet become fewer. Therefore, even if increasing the rust preventing pigment and the lower layer becomes further brittle, a sufficient corrosion resistance can be obtained. When separately baking the upper coat layer and lower coat layer, the change in hardness of the layers at the interface of the two layers becomes discontinuous, destruction easily occurs there, and both the workability and the corrosion resistance are lowered. Further, in the present invention, making the centerline average roughness Ra at the interface of the lower coat layer and upper coat layer 0.3 to 0.7 μm to secure adhesion between the upper coat layer and lower coat layer also contributes to securing the corrosion resistance.

The method of baking the paint film of the coated multilayer structure is not particularly limited. For example, hot air, induction heating, etc. may be utilized. A plurality of methods may also be used together. In the case of an irradiation curing type coat layer, it is also possible to simultaneously use irradiation. From the viewpoint of the productivity, while not as preferable as baking by forced drying by heating, the coat layers may also be naturally dried. In the case of heating, the metal sheet is generally raised in temperature to 40 to 250° C.

The suitable thickness of the upper coat layer is, in terms of average thickness, 10 to 30 μm. If thinner than 10 μm, the stain resistance cannot be sufficiently secured, while if thicker than 30 μm, the layer is inferior in economy and further the workability may drop. A more preferable thickness of the upper coat layer is 12 to 20 μm.

The thickness of the lower coat layer may be suitably determined from the workability and, in some cases, the corrosion resistance and other aspects of the performance, but in general the suitable thickness is 2 to 15 μm. If thinner than 2 μm, the layer is inferior in corrosion resistance, while if thicker than 15 μm, it is inferior in economy and also drops in workability in some cases. A more preferable thickness of the lower coat layer is 5 to 10 μm.

The average thickness may be measured using the above method utilizing an enlarged photograph of the cross-section. Any other method may also be used. For convenience, the weight method may be utilized (though it is necessary to separately form and measure the lower coat layer and upper coat layer).

Examples will be used to further explain the present invention, but the present invention is not limited to these examples.

EXAMPLES

Example 1

Figure 11:
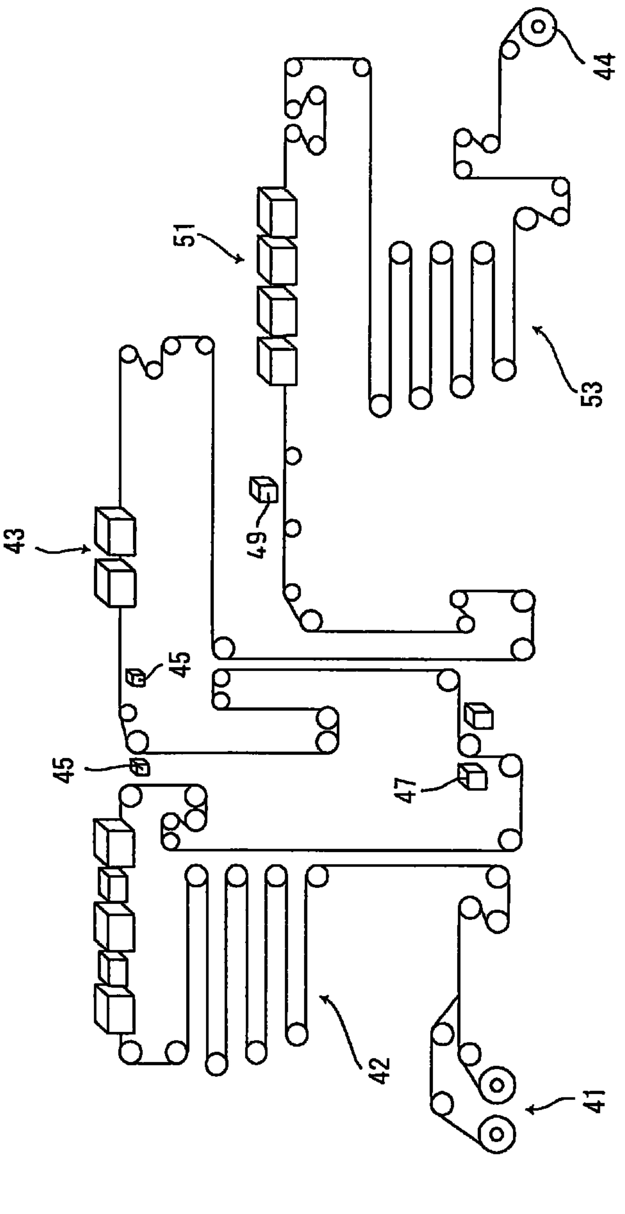
FIG. 11 is a schematic view explaining a production processing line of a precoated steel sheet used in the examples.

The present invention was applied to the case when using the production treatment line for a precoated steel sheet shown in FIG. 11 to curtain coat a multilayer film on a steel strip.

In the facility of FIG. 11, the steel strip wound in a coil was uncoiled by an uncoiler 41 and passed through an accumulator 42, conversion treatment system 47, prime coater 45, and induction furnace 43. At a later position, a slide hopper type curtain coating system 49 of slide type is disposed to curtain coat the surface of a running steel sheet 11 with a multilayer film. Downstream of the curtain coating system 49, an induction furnace 51 was provided as a facility for drying and baking the coated paints. After this, the steel sheet is passed through an accumulator 53 and is coiled up by a recoiler 44 as a finished treated steel strip.

The slide hopper type curtain coating system 49 was used for simultaneous coating of two layers. The slide hopper type curtain coating system had a size of a slit width on the coater of 200 mm, an interval of slits of 500 μm, and a height to the steel sheet being coated of 150 mm. The steel sheet was moved under the multilayer slide coater where multilayer coats were formed on the steel sheet. After two layers of coats were simultaneously formed, they were dried and baked by an induction furnace. The lower layer had a thickness of 2 to 15 μm and the upper layer had a thickness of 0.5 to 15 μm. The heating rate of the induction furnace was made 2 to 10° C./s and the peak metal temperature of the steel sheet after baking was made 200 to 230° C.

The next paints were used.

Paint 1: High molecular weight polyester/isocyanate system

Paint 2: High molecular weight polyester/melamine system

Paint 3: High molecular weight polyester/melamine system

As the pigments added to the paints, the following were used.

White pigment: Titanium oxide pigment

Red pigment: Iron oxide pigment

Gray metallic pigment: Prepared by combining various types of pigments to obtain a gray color, then adding flat aluminum particles (long diameter of about 20 μm).

Clear metallic pigment: Prepared by adding flat aluminum particles (long diameter of about 20 μm) to clear paint.

As the levelers, the following were used.

Leveler A: Acryl-based leveler (made by Nippon Paint)

Leveler B: Silicone-based additive BYK141 (made BYK-Chemie)

Leveler C: Nonsilicone-based additive BYK057 (made by BYK-Chemie)

When coating the steel sheet with a primer, a nonchromate-based primer Flexicoat 690 Primer (made by Nippon Fine Coatings) was baked on to a dry thickness of 5 μm.

The surface tension was measured using a Dynometer (BYK-Chemie GmbH). Each paint was measured five times and the average value calculated was used as the surface tension of the paint. A paint of a difference between the maximum value and minimum value of the five measurements of less than 2 mN/m was evaluated as "A" and a paint of 2 mN/m or more was evaluated as "B".

The average thickness of the layers and the centerline average roughness Ra of the interface, were measured using the curve of the interface obtained by covering an ×5000 scan type micrograph of a cross-section of the coat layers by a transparent sheet used for OHP and tracing it, as explained earlier. Further, the ratio of the maximum height from the centerline of the waviness of the interface as observed by ×500 magnification to the thickness measured from centerline of the layer positioned on the interface was found as the waviness % of the interface.

The mottled-like tone score was expressed using no mottled-like tone able to be seen as a score of 5 and mottled-like tone occurring to an extent able to be sufficiently confirmed visually as a score of 1 and dividing the interval between them into different extents of occurrence of mottled-like tone, as explained above. For example, a score of 4 indicates mottled-like tone which cannot be clearly seen visually, but is of an extent which can be confirmed by viewing by a ×10 loupe.

The coin scratch test was used to evaluate the adhesion between the coat layers. The coated surface of each steel sheet was scratched by pressing a 100 yen Japanese coin against it so as to make a scratch reaching the base sheet and evaluating the occurrence of peeling at the interface of the two simultaneously coated layers at the two ends of the scratch as "poor" and no occurrence as "good".

The working heat adhesion between the coat layers was evaluated by the following method. Each steel sheet was drawn into a cylindrical cup by a draw ratio of 2.0 and a wrinkle suppressing pressure of 1.0 ton so that the evaluated surface became the outside. After that, the cup was heated by a hot air oven at 120° C. for 20 minutes, then taken out and observed for the coat appearance of the cup side surface after cooling. A sample with peeling of the coats or cracking of the coats was evaluated as "poor" and one with none of the above as "good".

Table 1 and Table 2 show the results of the experiments. These tables show only examples with primers, but the results were the same for the cases with no primers as well.

TABLE 1

| | | | Lower layer | | | | | | | |
|---|---|---|---|---|---|---|---|---|---|---|
| | | | | | Surface tension | | | | Average | Upper |
| No. | | Primer | Paint | Leveler | Average value (mN/m) | Fluctuation | Viscosity (sec) | Color (pigment) | thickness (μm) | layer Paint |
| 1 | Ex. | Yes | Paint 2 | None | 33.8 | A | 120 | White | 10 | Paint 2 |
| 2 | Ex. | Yes | Paint 2 | None | 33.8 | A | 120 | White | 2 | Paint 2 |
| 3 | Ex. | Yes | Paint 2 | None | 33.8 | A | 120 | White | 2 | Paint 2 |
| 4 | Ex. | Yes | Paint 2 | None | 33.8 | A | 120 | White | 5 | Paint 2 |
| 5 | Ex. | Yes | Paint 2 | None | 33.8 | A | 120 | White | 5 | Paint 2 |
| 6 | Ex. | Yes | Paint 2 | None | 33.8 | A | 120 | White | 15 | Paint 2 |
| 7 | Comp. Ex. | Yes | Paint 2 | None | 33.8 | A | 120 | White | 10 | Paint 2 |
| 8 | Comp. Ex. | Yes | Paint 2 | None | 33.8 | A | 120 | White | 2 | Paint 2 |
| 9 | Comp. Ex. | Yes | Paint 2 | None | 33.8 | A | 120 | White | 2 | Paint 2 |
| 10 | Comp. Ex. | Yes | Paint 2 | None | 33.8 | A | 120 | White | 5 | Paint 2 |
| 11 | Comp. Ex. | Yes | Paint 2 | None | 33.8 | A | 120 | White | 5 | Paint 2 |
| 12 | Comp. Ex. | Yes | Paint 2 | None | 33.8 | A | 120 | White | 15 | Paint 2 |
| 13 | Ex. | Yes | Paint 2 | None | 33.8 | A | 120 | White | 10 | Paint 2 |
| 14 | Ex. | Yes | Paint 2 | None | 33.8 | A | 120 | White | 2 | Paint 2 |
| 15 | Ex. | Yes | Paint 2 | None | 33.8 | A | 120 | White | 2 | Paint 2 |
| 16 | Ex. | Yes | Paint 2 | None | 33.8 | A | 120 | White | 5 | Paint 2 |
| 17 | Ex. | Yes | Paint 2 | None | 33.8 | A | 120 | White | 5 | Paint 2 |
| 18 | Ex. | Yes | Paint 2 | None | 33.8 | A | 120 | White | 15 | Paint 2 |
| 19 | Ex. | Yes | Paint 2 | None | 33.8 | A | 120 | White | 10 | Paint 2 |
| 20 | Ex. | Yes | Paint 2 | None | 33.8 | A | 120 | White | 15 | Paint 2 |
| 21 | Ex. | Yes | Paint 2 | None | 33.8 | A | 120 | White | 15 | Paint 2 |
| 22 | Ex. | Yes | Paint 2 | None | 33.7 | A | 120 | Gray metallic | 10 | Paint 2 |
| 23 | Ex. | Yes | Paint 2 | None | 33.7 | A | 120 | Gray metallic | 2 | Paint 2 |
| 24 | Ex. | Yes | Paint 2 | None | 33.7 | A | 120 | Gray metallic | 2 | Paint 2 |
| 25 | Ex. | Yes | Paint 2 | None | 33.7 | A | 120 | Gray metallic | 5 | Paint 2 |
| 26 | Ex. | Yes | Paint 2 | None | 33.7 | A | 120 | Gray metallic | 5 | Paint 2 |
| 27 | Ex. | Yes | Paint 2 | None | 33.7 | A | 120 | Gray metallic | 15 | Paint 2 |
| 28 | Ex. | Yes | Paint 2 | None | 33.7 | A | 120 | Gray metallic | 10 | Paint 2 |
| 29 | Ex. | Yes | Paint 2 | None | 33.7 | A | 120 | Gray metallic | 15 | Paint 2 |
| 30 | Ex. | Yes | Paint 2 | None | 33.7 | A | 120 | Gray metallic | 15 | Paint 2 |
| 31 | Ex. | Yes | Paint 2 | None | 33.8 | A | 120 | White | 10 | Paint 2 |
| 32 | Ex. | Yes | Paint 2 | None | 33.8 | A | 120 | White | 2 | Paint 2 |
| 33 | Ex. | Yes | Paint 2 | None | 33.8 | A | 120 | White | 2 | Paint 2 |

TABLE 1-continued

| | | Upper layer | | | | | | |
|---|---|---|---|---|---|---|---|---|
| | | | Surface tension | | | | Average | Surface tension |
| No. | | Leveler | Average value (mN/m) | Fluctuation | Viscosity (sec) | Color (pigment) | thickness (μm) | difference (lower-upper) |
| 1 | Ex. | A | 31.1 | A | 120 | Red | 15 | 2.7 |
| 2 | Ex. | A | 31.1 | A | 120 | Red | 15 | 2.7 |
| 3 | Ex. | A | 31.1 | A | 120 | Red | 10 | 2.7 |
| 4 | Ex. | A | 31.1 | A | 120 | Red | 15 | 2.7 |
| 5 | Ex. | A | 31.1 | A | 120 | Red | 10 | 2.7 |
| 6 | Ex. | A | 31.1 | A | 120 | Red | 10 | 2.7 |
| 7 | Comp. Ex. | C | 30.9 | B | 120 | Red | 15 | 2.9 |
| 8 | Comp. Ex. | C | 30.9 | B | 120 | Red | 15 | 2.9 |
| 9 | Comp. Ex. | C | 30.9 | B | 120 | Red | 10 | 2.9 |
| 10 | Comp. Ex. | C | 30.9 | B | 120 | Red | 15 | 2.9 |
| 11 | Comp. Ex. | C | 30.9 | B | 120 | Red | 10 | 2.9 |
| 12 | Comp. Ex. | C | 30.9 | B | 120 | Red | 10 | 2.9 |
| 13 | Ex. | A | 31.1 | A | 120 | Clear | 15 | 2.7 |
| 14 | Ex. | A | 31.1 | A | 120 | Clear | 15 | 2.7 |
| 15 | Ex. | A | 31.1 | A | 120 | Clear | 10 | 2.7 |
| 16 | Ex. | A | 31.1 | A | 120 | Clear | 15 | 2.7 |
| 17 | Ex. | A | 31.1 | A | 120 | Clear | 10 | 2.7 |
| 18 | Ex. | A | 31.1 | A | 120 | Clear | 10 | 2.7 |
| 19 | Ex. | A | 31.1 | A | 120 | Clear | 5 | 2.7 |
| 20 | Ex. | A | 31.1 | A | 120 | Clear | 1 | 2.7 |
| 21 | Ex. | A | 31.1 | A | 120 | Clear | 0.5 | 2.7 |
| 22 | Ex. | A | 31.1 | A | 120 | Clear | 15 | 2.6 |
| 23 | Ex. | A | 31.1 | A | 120 | Clear | 15 | 2.6 |
| 24 | Ex. | A | 31.1 | A | 120 | Clear | 10 | 2.6 |
| 25 | Ex. | A | 31.1 | A | 120 | Clear | 15 | 2.6 |
| 26 | Ex. | A | 31.1 | A | 120 | Clear | 10 | 2.6 |
| 27 | Ex. | A | 31.1 | A | 120 | Clear | 10 | 2.6 |
| 28 | Ex. | A | 31.1 | A | 120 | Clear | 5 | 2.6 |
| 29 | Ex. | A | 31.1 | A | 120 | Clear | 1 | 2.6 |
| 30 | Ex. | A | 31.1 | A | 120 | Clear | 0.5 | 2.6 |
| 31 | Ex. | A | 31.1 | A | 120 | Clear metallic | 15 | 2.7 |
| 32 | Ex. | A | 31.1 | A | 120 | Clear metallic | 15 | 2.7 |
| 33 | Ex. | A | 31.1 | A | 120 | Clear metallic | 10 | 2.7 |

| No. | | Primer | Lower layer | Upper layer | Surface tension difference (lower-upper) | No. | | Primer | Lower layer |
|---|---|---|---|---|---|---|---|---|---|
| 34 | Ex. | Yes | Paint 2 | None | 33.8 | A | 120 | White | 5 |
| 35 | Ex. | Yes | Paint 2 | None | 33.8 | A | 120 | White | 5 |
| 36 | Ex. | Yes | Paint 2 | None | 33.8 | A | 120 | White | 15 |
| 37 | Ex. | Yes | Paint 2 | None | 33.8 | A | 120 | White | 10 |
| 38 | Ex. | Yes | Paint 2 | None | 33.8 | A | 120 | White | 10 |
| 39 | Ex. | Yes | Paint 1 | None | 33.1 | A | 140 | White | 10 |
| 40 | Ex. | Yes | Paint 1 | None | 33.5 | A | 666 | White | 10 |
| 41 | Ex. | Yes | Paint 1 | None | 33.5 | A | 666 | White | 10 |
| 42 | Ex. | Yes | Paint 1 | None | 33.1 | A | 266 | White | 10 |
| 43 | Ex. | Yes | Paint 1 | None | 33.1 | A | 266 | White | 10 |
| 44 | Ex. | Yes | Paint 1 | None | 33.1 | A | 266 | White | 10 |
| 45 | Ex. | Yes | Paint 1 | None | 33.1 | A | 266 | White | 10 |
| 46 | Ex. | Yes | Paint 1 | None | 33.5 | A | 666 | White | 10 |
| 47 | Ex. | Yes | Paint 1 | None | 33.5 | A | 666 | White | 10 |
| 48 | Ex. | Yes | Paint 1 | None | 33.1 | A | 266 | White | 10 |
| 49 | Ex. | Yes | Paint 1 | None | 33.1 | A | 266 | White | 10 |
| 50 | Comp. Ex. | Yes | Paint 1 | None | 33.1 | A | 266 | White | 10 |
| 51 | Comp. Ex. | Yes | Paint 1 | None | 33.1 | A | 266 | White | 10 |
| 52 | Comp. Ex. | Yes | Paint 1 | None | 33.1 | A | 140 | White | 10 |
| 53 | Comp. Ex. | Yes | Paint 1 | None | 33.1 | A | 140 | White | 2 |
| 54 | Comp. Ex. | Yes | Paint 1 | None | 33.1 | A | 140 | White | 2 |
| 55 | Comp. Ex. | Yes | Paint 1 | None | 33.1 | A | 140 | White | 5 |
| 56 | Comp. Ex. | Yes | Paint 1 | None | 33.1 | A | 140 | White | 5 |
| 57 | Comp. Ex. | Yes | Paint 1 | None | 33.1 | A | 140 | White | 15 |
| 58 | Comp. Ex. | Yes | Paint 1 | None | 31.4 | A | 200 | White | 10 |
| 59 | Comp. Ex. | Yes | Paint 1 | None | 31.3 | A | 200 | White | 10 |
| 60 | Comp. Ex. | Yes | Paint 1 | None | 31.2 | A | 200 | White | 10 |
| 61 | Comp. Ex. | Yes | Paint 1 | None | 31.2 | A | 200 | White | 10 |
| 62 | Comp. Ex. | Yes | Paint 1 | None | 32.9 | A | 140 | White | 10 |
| 63 | Comp. Ex. | Yes | Paint 1 | None | 31.4 | A | 200 | White | 10 |
| 64 | Comp. Ex. | Yes | Paint 1 | None | 31.3 | A | 200 | White | 10 |
| 65 | Comp. Ex. | Yes | Paint 1 | None | 32.5 | A | 80 | White | 10 |

TABLE 1-continued

| | | | | | | | | | |
|---|---|---|---|---|---|---|---|---|---|
| 66 | Comp. Ex. | Yes | Paint 1 | None | 31.8 | A | 140 | White | 10 |
| 67 | Comp. Ex. | Yes | Paint 1 | None | 31 | A | 80 | White | 10 |
| 68 | Ex. | Yes | Paint 3 | None | 35.1 | A | 120 | White | 10 |
| 69 | Ex. | Yes | Paint 3 | A | 33.8 | A | 120 | White | 10 |
| 70 | Ex. | Yes | Paint 2 | A | 33.8 | A | 120 | White | 10 |

| No. | | Upper layer | Surface tension difference (lower-upper) | No. | | Primer | Lower layer | Upper layer | Surface tension difference (lower-upper) |
|---|---|---|---|---|---|---|---|---|---|
| 34 | Ex. | Paint 2 | A | 31.1 | A | 120 | Clear metallic | 15 | 2.7 |
| 35 | Ex. | Paint 2 | A | 31.1 | A | 120 | Clear metallic | 10 | 2.7 |
| 36 | Ex. | Paint 2 | A | 31.1 | A | 120 | Clear metallic | 10 | 2.7 |
| 37 | Ex. | Paint 2 | B | 30.8 | A | 120 | Red | 15 | 3 |
| 38 | Ex. | Paint 1 | A | 31.8 | A | 120 | Red | 15 | 2 |
| 39 | Ex. | Paint 2 | A | 31.1 | A | 120 | Red | 15 | 2 |
| 40 | Ex. | Paint 1 | A | 31.1 | A | 740 | Red | 15 | 2.4 |
| 41 | Ex. | Paint 1 | A | 31.4 | A | 180 | Red | 15 | 2.1 |
| 42 | Ex. | Paint 1 | A | 31.1 | A | 642 | Red | 15 | 2 |
| 43 | Ex. | Paint 1 | A | 31.4 | A | 297 | Red | 15 | 1.7 |
| 44 | Ex. | Paint 1 | A | 31.4 | A | 184 | Red | 15 | 1.7 |
| 45 | Ex. | Paint 1 | A | 31.4 | A | 137 | Red | 15 | 1.7 |
| 46 | Ex. | Paint 1 | A | 31.8 | A | 120 | Red | 15 | 1.7 |
| 47 | Ex. | Paint 1 | A | 32.1 | A | 180 | Red | 15 | 1.4 |
| 48 | Ex. | Paint 1 | A | 31.8 | A | 106 | Red | 15 | 1.3 |
| 49 | Ex. | Paint 1 | A | 31.9 | A | 84 | Red | 15 | 1.2 |
| 50 | Comp. Ex. | Paint 1 | A | 32 | A | 59 | Red | 15 | 1.1 |
| 51 | Comp. Ex. | Paint 1 | A | 32 | A | 37 | Red | 15 | 1.1 |
| 52 | Comp. Ex. | Paint 1 | A | 32.1 | A | 180 | Red | 15 | 1 |
| 53 | Comp. Ex. | Paint 1 | A | 32.1 | A | 180 | Red | 15 | 1 |
| 54 | Comp. Ex. | Paint 1 | A | 32.1 | A | 180 | Red | 10 | 1 |
| 55 | Comp. Ex. | Paint 1 | A | 32.1 | A | 180 | Red | 15 | 1 |
| 56 | Comp. Ex. | Paint 1 | A | 32.1 | A | 180 | Red | 10 | 1 |
| 57 | Comp. Ex. | Paint 1 | A | 32.1 | A | 180 | Red | 10 | 1 |
| 58 | Comp. Ex. | Paint 1 | A | 30.4 | A | 200 | Red | 15 | 1 |
| 59 | Comp. Ex. | Paint 1 | A | 30.4 | A | 200 | Red | 15 | 0.9 |
| 60 | Comp. Ex. | Paint 1 | A | 30.4 | A | 200 | Red | 15 | 0.8 |
| 61 | Comp. Ex. | Paint 1 | A | 30.4 | A | 200 | Red | 15 | 0.8 |
| 62 | Comp. Ex. | Paint 1 | A | 32.1 | A | 180 | Red | 15 | 0.8 |
| 63 | Comp. Ex. | Paint 1 | A | 30.7 | A | 200 | Red | 15 | 0.7 |
| 64 | Comp. Ex. | Paint 1 | A | 30.7 | A | 200 | Red | 15 | 0.6 |
| 65 | Comp. Ex. | Paint 1 | A | 32.1 | A | 180 | Red | 15 | 0.4 |
| 66 | Comp. Ex. | Paint 1 | A | 32.1 | A | 180 | Red | 15 | −0.3 |
| 67 | Comp. Ex. | Paint 1 | A | 32.1 | A | 180 | Red | 15 | −1.1 |
| 68 | Ex. | Paint 2 | A | 30.1 | A | 120 | Red | 15 | 5 |
| 69 | Ex. | Paint 2 | A | 30.1 | A | 120 | Red | 15 | 3.7 |
| 70 | Ex. | Paint 2 | A | 31.1 | A | 120 | Red | 15 | 2.7 |

| | | Lower layer | | | | | | | | |
|---|---|---|---|---|---|---|---|---|---|---|
| | | | | | Surface tension | | | | Average | Upper |
| No. | | Primer | Paint | Leveler | Average value (mN/m) | Fluctuation | Viscosity (sec) | Color (pigment) | thickness (μm) | layer Paint |
| 71 | Comp. Ex. | Yes | Paint 2 | C | 33.5 | B | 120 | White | 10 | Paint 2 |
| 72 | Ex. | Yes | Paint 2 | B | 33 | A | 120 | White | 10 | Paint 2 |
| 73 | Ex. | Yes | Paint 2 | B | 33 | A | 120 | White | 10 | Paint 2 |
| 74 | Ex. | Yes | Paint 2 | A | 33.8 | A | 120 | White | 10 | Paint 2 |
| 75 | Ex. | Yes | Paint 2 | A | 33.1 | A | 120 | White | 10 | Paint 2 |
| 76 | Ex. | Yes | Paint 2 | A | 31.5 | A | 120 | White | 10 | Paint 2 |
| 77 | Ex. | Yes | Paint 2 | A | 31.4 | A | 120 | White | 10 | Paint 2 |
| 78 | Ex. | Yes | Paint 2 | A | 31.4 | A | 120 | White | 10 | Paint 2 |
| 79 | Comp. Ex. | Yes | Paint 1 | A | 31 | A | 200 | White | 10 | Paint 1 |
| 80 | Comp. Ex. | Yes | Paint 2 | A | 31.4 | A | 120 | White | 10 | Paint 2 |
| 81 | Comp. Ex. | Yes | Paint 1 | None | 31.2 | A | 200 | White | 10 | Paint 1 |
| 82 | Comp. Ex. | Yes | Paint 1 | None | 33.1 | A | 266 | White | 10 | Paint 1 |
| 83 | Comp. Ex. | Yes | Paint 1 | None | 31.2 | A | 200 | White | 10 | Paint 1 |
| 84 | Comp. Ex. | Yes | Paint 1 | None | 31.2 | A | 200 | White | 10 | Paint 1 |
| 85 | Comp. Ex. | Yes | Paint 1 | None | 31.2 | A | 200 | White | 10 | Paint 1 |
| 86 | Comp. Ex. | Yes | Paint 1 | None | 31.4 | A | 200 | White | 10 | Paint 1 |
| 87 | Comp. Ex. | Yes | Paint 1 | None | 31.4 | A | 200 | White | 10 | Paint 1 |
| 88 | Comp. Ex. | Yes | Paint 1 | A | 31 | A | 200 | White | 10 | Paint 1 |
| 89 | Comp. Ex. | Yes | Paint 2 | A | 31.5 | A | 120 | White | 10 | Paint 2 |
| 90 | Comp. Ex. | Yes | Paint 2 | A | 31.5 | A | 120 | White | 10 | Paint 2 |
| 91 | Comp. Ex. | Yes | Paint 2 | A | 31.4 | A | 120 | White | 10 | Paint 2 |

TABLE 1-continued

| No. | | Upper layer: Leveler | Upper layer: Surface tension: Average value (mN/m) | Upper layer: Surface tension: Fluctuation | Upper layer: Viscosity (sec) | Upper layer: Color (pigment) | Average thickness (μm) | Surface tension difference (upper-lower) |
|---|---|---|---|---|---|---|---|---|
| 71 | Comp. Ex. | A | 31.1 | A | 120 | Red | 15 | 2.4 |
| 72 | Ex. | B | 30.8 | A | 120 | Red | 15 | 2.2 |
| 73 | Ex. | A | 31.1 | A | 120 | Red | 15 | 1.9 |
| 74 | Ex. | B | 30.8 | A | 120 | Red | 15 | 3 |
| 75 | Ex. | A | 31.1 | A | 120 | Red | 15 | 2 |
| 76 | Ex. | A | 31.1 | A | 120 | Red | 15 | 0.4 |
| 77 | Ex. | A | 31.1 | A | 120 | Red | 15 | 0.3 |
| 78 | Ex. | A | 31.1 | A | 120 | Red | 15 | 0.3 |
| 79 | Comp. Ex. | A | 30.8 | A | 200 | Red | 15 | 0.2 |
| 80 | Comp. Ex. | A | 31.3 | A | 120 | Red | 15 | 0.1 |
| 81 | Comp. Ex. | None | 31 | A | 200 | Red | 15 | 0.2 |
| 82 | Comp. Ex. | None | 32.6 | A | 180 | Red | 15 | 0.5 |
| 83 | Comp. Ex. | None | 30.9 | A | 200 | Red | 15 | 0.3 |
| 84 | Comp. Ex. | None | 31 | A | 200 | Red | 15 | 0.2 |
| 85 | Comp. Ex. | None | 30.9 | A | 200 | Red | 15 | 0.3 |
| 86 | Comp. Ex. | None | 31 | A | 200 | Red | 15 | 0.4 |
| 87 | Comp. Ex. | None | 30.9 | A | 200 | Red | 15 | 0.5 |
| 88 | Comp. Ex. | None | 31 | A | 200 | Red | 15 | 0 |
| 89 | Comp. Ex. | None | 33.5 | A | 120 | Red | 15 | −2 |
| 90 | Comp. Ex. | None | 33.5 | A | 120 | Red | 15 | −2 |
| 91 | Comp. Ex. | None | 33.5 | A | 120 | Red | 15 | −2.1 |

TABLE 2

| No. | | Mottled-like tone score | Ra of interface (μm) | Interface waviness % (with respect to upper layer thickness) | Adhesion between layers (coin scratch) | Work heat adhesion |
|---|---|---|---|---|---|---|
| 1 | Ex. | 5 | 0.49 | 7 | Good | Good |
| 2 | Ex. | 5 | 0.42 | 3 | Good | Good |
| 3 | Ex. | 5 | 0.57 | 5 | Good | Good |
| 4 | Ex. | 5 | 0.51 | 3 | Good | Good |
| 5 | Ex. | 5 | 0.58 | 5 | Good | Good |
| 6 | Ex. | 5 | 0.70 | 7 | Good | Good |
| 7 | Comp. Ex. | 1 | 0.52 | 100 | Good | Good |
| 8 | Comp. Ex. | 3 | 0.42 | 55 | Good | Good |
| 9 | Comp. Ex. | 3 | 0.57 | 60 | Good | Good |
| 10 | Comp. Ex. | 2 | 0.51 | 80 | Good | Good |
| 11 | Comp. Ex. | 2 | 0.58 | 100 | Good | Good |
| 12 | Comp. Ex. | 1 | 0.70 | 100 | Good | Good |
| 13 | Ex. | 5 | 0.64 | 7 | Good | Good |
| 14 | Ex. | 5 | 0.43 | 3 | Good | Good |
| 15 | Ex. | 5 | 0.35 | 5 | Good | Good |
| 16 | Ex. | 5 | 0.69 | 3 | Good | Good |
| 17 | Ex. | 5 | 0.54 | 5 | Good | Good |
| 18 | Ex. | 5 | 0.56 | 5 | Good | Good |
| 19 | Ex. | 5 | 0.30 | 10 | Good | Good |
| 20 | Ex. | 5 | 0.25 | 30 | Good | Good |
| 21 | Ex. | 5 | 0.12 | 40 | Good | Good |
| 22 | Ex. | 5 | 0.43 | 7 | Good | Good |
| 23 | Ex. | 5 | 0.63 | 3 | Good | Good |
| 24 | Ex. | 5 | 0.56 | 5 | Good | Good |
| 25 | Ex. | 5 | 0.47 | 3 | Good | Good |
| 26 | Ex. | 5 | 0.47 | 5 | Good | Good |
| 27 | Ex. | 5 | 0.67 | 5 | Good | Good |
| 28 | Ex. | 5 | 0.35 | 10 | Good | Good |
| 29 | Ex. | 5 | 0.21 | 35 | Good | Good |
| 30 | Ex. | 5 | 0.15 | 45 | Good | Good |
| 31 | Ex. | 5 | 0.58 | 7 | Good | Good |
| 32 | Ex. | 5 | 0.49 | 3 | Good | Good |
| 33 | Ex. | 5 | 0.60 | 5 | Good | Good |
| 34 | Ex. | 5 | 0.50 | 3 | Good | Good |
| 35 | Ex. | 5 | 0.30 | 5 | Good | Good |
| 36 | Ex. | 5 | 0.39 | 5 | Good | Good |
| 37 | Ex. | 5 | 0.37 | 7 | Good | Good |
| 38 | Ex. | 5 | 0.38 | 10 | Good | Good |
| 39 | Ex. | 5 | 0.34 | 7 | Good | Good |
| 40 | Ex. | 5 | 0.60 | 7 | Good | Good |
| 41 | Ex. | 5 | 0.66 | 7 | Good | Good |
| 42 | Ex. | 5 | 0.61 | 10 | Good | Good |

TABLE 2-continued

| No. | | Mottled-like tone score | Ra of interface (μm) | Interface waviness % (with respect to upper layer thickness) | Adhesion between layers (coin scratch) | Work heat adhesion |
|---|---|---|---|---|---|---|
| 43 | Ex. | 5 | 0.57 | 7 | Good | Good |
| 44 | Ex. | 5 | 0.57 | 7 | Good | Good |
| 45 | Ex. | 5 | 0.52 | 7 | Good | Good |
| 46 | Ex. | 5 | 0.51 | 0 | Good | Good |
| 47 | Ex. | 5 | 0.69 | 0 | Good | Good |
| 48 | Ex. | 5 | 0.65 | 7 | Good | Good |
| 49 | Ex. | 5 | 0.37 | 7 | Good | Good |
| 50 | Comp. Ex. | 4 | 0.61 | 65 | Good | Good |
| 51 | Comp. Ex. | 2 | 0.35 | 100 | Good | Good |
| 52 | Comp. Ex. | 4 | 0.52 | 55 | Good | Good |
| 53 | Comp. Ex. | 4 | 0.67 | 50 | Good | Good |
| 54 | Comp. Ex. | 4 | 0.37 | 55 | Good | Good |
| 55 | Comp. Ex. | 4 | 0.41 | 60 | Good | Good |
| 56 | Comp. Ex. | 4 | 0.49 | 65 | Good | Good |
| 57 | Comp. Ex. | 4 | 0.51 | 100 | Good | Good |
| 58 | Comp. Ex. | 4 | 0.70 | 50 | Good | Good |
| 59 | Comp. Ex. | 4 | 0.58 | 55 | Good | Good |
| 60 | Comp. Ex. | 4 | 0.30 | 50 | Good | Good |
| 61 | Comp. Ex. | 4 | 0.36 | 55 | Good | Good |
| 62 | Comp. Ex. | 4 | 0.43 | 55 | Good | Good |
| 63 | Comp. Ex. | 4 | 0.51 | 70 | Good | Good |
| 64 | Comp. Ex. | 4 | 0.45 | 60 | Good | Good |
| 65 | Comp. Ex. | 3 | 0.69 | 90 | Good | Good |
| 66 | Comp. Ex. | 2 | 0.64 | 100 | Good | Good |
| 67 | Comp. Ex. | 1 | 0.33 | 100 | Good | Good |
| 68 | Ex. | 5 | 0.28 | 3 | Poor | Poor |
| 69 | Ex. | 5 | 0.29 | 3 | Poor | Poor |
| 70 | Ex. | 5 | 0.48 | 3 | Good | Good |
| 71 | Comp. Ex. | 2 | 0.55 | 100 | Good | Good |
| 72 | Ex. | 5 | 0.48 | 3 | Good | Good |
| 73 | Ex. | 5 | 0.47 | 3 | Good | Good |
| 74 | Ex. | 5 | 0.64 | 3 | Good | Good |
| 75 | Ex. | 5 | 0.67 | 3 | Good | Good |
| 76 | Ex. | 5 | 0.66 | 3 | Good | Good |
| 77 | Ex. | 5 | 0.41 | 3 | Good | Good |
| 78 | Ex. | 5 | 0.54 | 3 | Good | Good |
| 79 | Comp. Ex. | 4 | 0.34 | 60 | Good | Good |
| 80 | Comp. Ex. | 4 | 0.52 | 65 | Good | Good |
| 81 | Comp. Ex. | 4 | 0.55 | 65 | Good | Good |
| 82 | Comp. Ex. | 2 | 0.65 | 100 | Good | Good |
| 83 | Comp. Ex. | 3 | 0.69 | 85 | Good | Good |
| 84 | Comp. Ex. | 2 | 0.66 | 100 | Good | Good |
| 85 | Comp. Ex. | 2 | 0.30 | 100 | Good | Good |
| 86 | Comp. Ex. | 2 | 0.62 | 100 | Good | Good |
| 87 | Comp. Ex. | 2 | 0.63 | 100 | Good | Good |
| 88 | Comp. Ex. | 2 | 0.37 | 100 | Good | Good |
| 89 | Comp. Ex. | 1 | 0.62 | 100 | Good | Good |
| 90 | Comp. Ex. | 1 | 0.68 | 100 | Good | Good |
| 91 | Comp. Ex. | 1 | 0.62 | 100 | Good | Good |

Example 2

A similar method as with Example 1 was used to simultaneously coat three layers on a steel strip. The paints, pigments, and levelers used were as described in Example 1. Table 3 and Table 4 show the results of the experiments.

TABLE 3

| | | | Layer 1 | | | | | | | Layer 2 | | |
|---|---|---|---|---|---|---|---|---|---|---|---|---|
| | | | | | Surface tension | | | | | | | Surface tension |
| No. | | Primer | Paint | Leveler | Average value (mN/m) | Fluctuation | Viscosity (sec) | Color (pigment) | Average thickness (μm) | Paint | Leveler | Average value (mN/m) |
| 1 | Ex. | Yes | Paint 1 | A | 32.1 | A | 180 | Red | 5 | Paint 2 | A | 31.5 |
| 2 | Ex. | Yes | Paint 2 | None | 33.5 | A | 120 | Red | 5 | Paint 2 | A | 31.5 |
| 3 | Comp. Ex. | Yes | Paint 1 | None | 32.6 | A | 180 | Red | 5 | Paint 2 | A | 31.5 |

TABLE 3-continued

| No. | | Layer 2 Surface tension Fluctuation | Viscosity (sec) | Color (pigment) | Average thickness (μm) | Surface tension difference (layer 1-layer 2) | Ra of interface (μm) | Interface waviness % (with respect to upper layer thickness) |
|---|---|---|---|---|---|---|---|---|
| 1 | Ex. | A | 120 | White | 10 | 0.6 | 0.45 | 3 |
| 2 | Ex. | A | 120 | White | 10 | 2.0 | 0.38 | 3 |
| 3 | Comp. Ex. | A | 120 | White | 10 | 1.1 | 0.33 | 80 |

TABLE 4

| No. | | Layer 3 | | | | | | | |
|---|---|---|---|---|---|---|---|---|---|
| | | | | Surface tension | | | | Average | Surface tension |
| | | Paint | Leveler | Average value (mN/m) | Fluctuation | Viscosity (sec) | Color (pigment) | thickness (μm) | difference (layer 2-layer 3) |
| 1 | Ex. | Paint 2 | A | 31.1 | A | 120 | Red | 15 | 0.4 |
| 2 | Ex. | Paint 2 | A | 31.1 | A | 120 | Red | 15 | 0.4 |
| 3 | Comp. Ex. | Paint 2 | A | 31.1 | A | 120 | Red | 15 | 0.4 |

| No. | | Ra of interface (μm) | Interface waviness % (with respect to upper layer thickness) | Mottled-like tone score | Interlayer adhesion (coin scratch) |
|---|---|---|---|---|---|
| 1 | Ex. | 0.66 | 3 | 5 | Good |
| 2 | Ex. | 0.66 | 3 | 5 | Good |
| 3 | Comp. Ex. | 0.66 | 55 | 4 | Good |

Example 3

Using the ratio as shown in Table 5, paints for the lower coat layer and upper clear layer were prepared. Specifically, the individual polyester resins shown in Example 3A to 3E of Table 5 were dissolved in an organic solvent cyclohexanone/Sorbesso (name of product of Exxon Chemical) 150. Next, in accordance with need, a melamine resin (methylated melamine (product name: Cymel 303, made by Mitsui Cytec)) or an isocyanate curing agent (Desmodur BL3175, made by Mitsui Cyanamide) was added to each of these paints, then in accordance with need a catalyst (product name: Catalyst 6000, made by Mitsui Cytec) or TK1 (made by Takeda Chemical) was added, then the results were stirred to obtain the paint used.

To adjust the surface tension, a leveler BYK141 (made by BYK-Chemie) was added to the lower layer paint in an amount of 0.1 wt %, while an acryl-based leveler (made by Nippon Paint) was added to the upper layer paint in an amount of 0.3 wt %. The surface tension was measured by a Dynometer (made by BYK-Chemie GmbH).

Galvanized steel sheet plated on both sides with an amount of deposition per side of 60 g/m$^2$ and having a thickness of 0.8 mm was immersed in a degreasing treatment agent (made by Nippon Parkerizing) to degrease it, was washed with water, then was dried. Next, the degreased galvanized steel sheet was coated by a roll coater with a chromate-free pretreatment agent (E300N, made by Nippon Parkerizing) and dried by hot air under conditions giving a peak metal temperature of 60° C.

After the nonchromate pretreatment, a slide hopper type curtain coating system was used to form the paint films shown in Table 5 on a galvanized steel sheet after the chromate-free pretreatment by simultaneous coating. These layers were simultaneously baked (peak metal temperature (PMT) 235° C., 1 minute) to form on the galvanized steel sheet a lower coat layer (thickness of 15 μm) and an upper clear layer (thickness of 10 μm or 1 μm).

Example 4

A resin layer for forming the lower coat layer was formed on a galvanized steel sheet as used in Example 3 after chromate-free pretreatment thereof using a roll coater, and was then dried by hot air at a PMT of 215° C. for 45 seconds. Next, a resin layer for the upper coat layer was formed using a roll coater, and was then dried at a PMT of 235° C. for 1 minute.

The coated metal sheets obtained in Examples 3 and 4 were evaluated for characteristics.

The Ra of the interface was evaluated by the above-mentioned method.

A super UV tester (Iwasaki Electric) was used for an accelerated test of the weather resistance of the coat layers. A cycle of standing under UV irradiation for 24 hours and in an atmosphere of 50° C. and 95% relative humidity for 24 hours was repeated five times and then the appearance evaluated.

Further, the coats were cut by a cutter knife into a grid of 1 mm squares, then a commercially available adhesive tape (Cellotape®) was used to conduct a peeling test to evaluate the adhesion of the coat layers. Coat layers with no remarkable abnormalities in appearance were evaluated as being “good” in adhesion, while coat layers with interlayer peeling were evaluated as being “poor” in adhesion.

TABLE 5

| | Lower layer | | | | | Upper layer | |
|---|---|---|---|---|---|---|---|
| | Main ingredient | Curing agent | Catalyst | Thickness | Surface tension (mN/m) | Main ingredient | Curing agent |
| Ex. 3A | Polyester resin (brown) | Melamine resin *1 | *2 | 15 μm | 33.5 | Polyester clear resin | Melamine resin *1 |
| Ex. 3B | Polyester resin (brown) | None | None | 15 μm | 33.2 | Polyester clear resin | Melamine resin *1 |
| Ex. 3C | Polyester resin (brown) | Melamine resin *1 | *2 | 15 μm | 33.5 | Polyester clear resin | None |
| Ex. 3D | Polyester resin (brown) | Melamine resin *1 | *2 | 15 μm | 33.5 | Polyester clear resin | Isocyanate resin *3 |
| Ex. 3E | Polyester resin (brown) | Melamine resin *1 | *2 | 15 μm | 33.5 | Polyester clear resin | Melamine resin *1 |
| Ex. 4 (comp. Ex.) | Polyester resin (brown) | Melamine resin *1 | *2 | 15 μm | 33.5 | Polyester clear resin | Melamine resin *1 |

| | Upper layer | | | | | Results of weather |
|---|---|---|---|---|---|---|
| | Catalyst | Thickness | Surface tension (mN/m) | Method of production | Ra of interface | resistance acceleration test |
| Ex. 3A | *2 | 10 μm | 32.0 | Multilayer simul. coating | 0.6 μm | Good |
| Ex. 3B | *2 | 10 μm | 32.0 | Multilayer simul. coating | 0.3 μm | Good |
| Ex. 3C | None | 10 μm | 31.8 | Multilayer simul. coating | 0.7 μm | Good |
| Ex. 3D | *4 | 10 μm | 32.1 | Multilayer simul. coating | 0.5 μm | Good |
| Ex. 3E | *2 | 1 μm | 32.0 | Multilayer simul. coating | 0.3 μm | Good |
| Ex. 4 (comp. Ex.) | *2 | 10 μm | 32.0 | 2C2B | 0.1 μm | Poor (interlayer peeling) |

*1 Methylated melamine (Cymel 303, Mitsui Cyanamide polyester resin/melamine resin = 70/30 blend)
*2 Catalyst 6000 (Mitsui Cyanamide) 1.5 phr blended with respect to resin solid content
*3 Isocyanate curing agent (Desmodur BL3175, Sumitomo Bayer Urethane (blended to give NCO/OH = 1.0)
*4 TK1 (Takeda Chemical), 0.3 phr blended with respect to resin solid content As clear from Table 5 showing the experimental findings, the precoated metal sheets of Examples 3A to 3E of the present invention did not exhibit any interlayer peeling between the lower coat layer and upper clear layer or chalking even after the accelerated test for weather resistance.

On the other hand, the precoated metal sheet of Example 4 (comparative example) exhibited interlayer peeling between the lower coat layer and upper clear layer after the accelerated test for weather resistance.

Example 5

In this example, a precoated metal sheet provided with both workability and corrosion resistance will be explained.

As the metal sheet, a galvanized steel sheet (thickness of 0.6 mm, width of 200 mm) subjected to a nonchromate treatment (E300N made by Nippon Parkerizing) as the undercoat treatment was used.

As the lower layer paint, a paint obtained from Nippon Paint, which was prepared from a polyester (molecular weight of 12000) in an amount of 100 parts by mass, a curing agent (melamine resin in an amount of 20 parts by mass, an epoxy resin in an amount of 20 parts by mass, or a urethane resin in an amount of 10 parts by mass), and a solvent (mixed solvent of 1:1 mass ratio of Anone (cyclohexanone)/S150 (Sorbesso 150), however, with the lower layer paint of no. 7, 40% of the mixed solvent replaced with EEP (ethyl-3-ethoxypropionate)) in an amount of 170 parts by mass, was used (the amounts of the ingredients other than the solvent being expressed as solid content). The rust preventing pigment shown in Table 6 was added to the lower layer paint. The amount was made an amount giving the average amount of rust preventing pigment shown in Table 6 in the lower layer formed by baking. Further, a leveler (BYK141 made by BYX-Chemie) was added to the lower layer paint in an amount of 0.1 wt %.

As the upper layer paint, a paint obtained from Nippon Paint, which was prepared from a polyester (molecular weight of 15000) in an amount of 100 parts by mass, a melamine resin curing agent in an amount of 20 parts by mass, a titanium white coloring pigment in an amount of 80 parts by mass, and a mixed solvent of a 1:1 weight ratio of Anone/S150 in an amount of 200 parts by mass, was used. The upper layer paint had added to it an acryl-based leveler (made by Nippon Paint) in an amount of 0.3 wt %.

The lower layer and upper layer paints were simultaneously coated on steel sheet by a slide curtain coater and simultaneously baked at the peak metal temperature (PMT) shown in Table 6 to prepare samples (in the case of simultaneous baking, in Table 6, PMT shown only in the data column of the upper layer). The upper layer formed by the simultaneous baking included the rust preventing pigment dispersed from the lower layer in the average amount shown in Table 6, but no rust preventing pigment was detected at the surface layer. As a comparative example, 2-coat 2-bake (2C2B) samples (paints of the lower layer and upper layer were separately coated by curtain coating and baked) were also prepared.

The surface tensions of the paints and the centerline average roughness Ra of the interface between the lower coat layer and upper coat layer were measured by the methods explained above.

Each prepared sample was evaluated for workability and corrosion resistance as follows.

The workability was evaluated by conducting a 180° bending test at 20° C. and finding the limit of the number T where no cracks or peeling is observed when a coat of a bent part is observed by a magnification of ×30 (the number T corresponding to the number of sheets of the same thickness sandwiched between parts bent 180°, for example, 1 T when sandwiching one sheet and 2 T when sandwiching two sheets). For example, when cracks are observed when bending by 2 T and cracks are not observed when bending by 3 T, the score was 3 T.

The corrosion resistance was evaluated by running a salt-water spray test based on JIS Z 2371. The lower half of a sample was cut with a cross and the width of the coat peeled off by taping after 240 hours was measured.

The results of the evaluation are shown in Table 7.

Nos. 1, 3, 7, and 8 are comparative examples. Nos. 1 3, and 8 of 2-coat 2-bake (2C2B) having centerline average roughnesses Ra of coat layer interfaces of less than 0.1 were insufficient in workability, while no. 8 was also insufficient in corrosion resistance. In no. 7 with an Ra of the coat layer interface of a large 0.9, the workability and the corrosion resistance were inferior, the distribution of the rust preventing pigment was uneven, some of the rust preventing pigment appeared at the surface layer, and the appearance was poor.

The invention claimed is:

1. A precoated metal sheet produced by multilayer simultaneous coating and superior in workability and corrosion resistance, comprising a lower coat layer and an upper coat layer thereon which are formed on a metal sheet by a multilayer simultaneous coating system, wherein

TABLE 6

Characteristics of Coats

| | | Lower layer | | | | | | Upper layer | | | | | | | |
|---|---|---|---|---|---|---|---|---|---|---|---|---|---|---|
| | Metal | | Rust preventing pigment | | Thick-ness | Surface tension | PMT | | Rust preventing pigment | Thick-ness | Surface tension | PMT | Ra of interface | |
| No. | sheet | Resin | Type | Am't (%) | (μm) | (mN/m) | (° C.) | Resin | am't (%) | (μm) | (mN/m) | (° C.) | (μm) | Remarks |
| 1 | GI | Polyester/melamine | SC | 25 | 8 | 33.2 | 215 | Polyester/melamine | 0 | 15 | 31.4 | 230 | <0.1 | Comp. Ex. 2C2B |
| 2 | GI | Polyester/melamine | SC | 25 | 8 | 33.2 | — | Polyester/melamine | 5 | 15 | 31.4 | 230 | 0.3 | Invention |
| 3 | GI | Polyester/melamine | SC | 35 | 8 | 33.2 | 215 | Polyester/melamine | 0 | 15 | 31.4 | 230 | <0.1 | Comp. Ex. 2C2B |
| 4 | GI | Polyester/melamine | SC | 35 | 8 | 33.2 | — | Polyester/melamine | 8 | 15 | 31.4 | 230 | 0.3 | Invention |
| 5 | GI | Polyester/epoxy | SC | 25 | 8 | 33.3 | — | Polyester/melamine | 5 | 15 | 31.4 | 230 | 0.6 | Invention |
| 6 | GI | Polyester/urethane | SC | 25 | 8 | 33.5 | — | Polyester/melamine | 5 | 15 | 31.4 | 230 | 0.7 | Invention |
| 7 | GI | Polyester/melamine | SC | 25 | 8 | 33.2 | — | Polyester/melamine | 5 | 15 | 31.4 | 230 | 0.9 | Comp. Ex. |
| 8 | GI | Polyester/melamine | CS | 35 | 8 | 33.2 | 215 | Polyester/melamine | 0 | 15 | 31.4 | 230 | <0.1 | Comp. Ex. 2C2B |
| 9 | GI | Polyester/melamine | CS | 35 | 8 | 33.2 | — | Polyester/melamine | 8 | 15 | 31.4 | 230 | 0.3 | Invention |
| 10 | GI | Polyester/melamine | SC | 52 | 8 | 33.2 | — | Polyester/melamine | 12 | 15 | 31.4 | 230 | 0.4 | Invention |
| 11 | GI | Polyester/melamine | CS | 52 | 8 | 33.2 | — | Polyester/melamine | 12 | 15 | 31.4 | 230 | 0.5 | Invention |

GI: galvanized steel sheet; SC: strontium chromate; CS: calcium silicate

TABLE 7

Coat Performance

| No. | Workability | Corrosion resistance (mm) | Remarks |
|---|---|---|---|
| 1 | 3T | 1-3 | Comp. Ex. 2C2B |
| 2 | 1T | 0.5-1 | Invention |
| 3 | 4T | 1-2 | Comp. Ex. 2C2B |
| 4 | 1T | 0.2-0.8 | Invention |
| 5 | 1T | 1-2 | Invention |
| 6 | 1T | 1-2 | Invention |
| 7 | 3T | 2-3 | Comp. Ex. |
| 8 | 5T | 1.5-2.5 | Comp. Ex. 2C2B |
| 9 | 1T | 0.5-1 | Invention |
| 10 | 1T | 0.1-0.5 | Invention |
| 11 | 1T | 0.1-0.8 | Invention |

the lower coat layer contains an average 30 wt % or more of a rust preventing pigment, and the upper coat layer contains a rust preventing pigment the same as the rust preventing pigment in the lower coat layer by an average content lower than the average content of the lower coat layer and by a concentration gradient gradually decreasing the further from the vicinity of the interface with the lower coat layer, and the centerline average roughness Ra of the interface between the lower coat layer and upper coat layer is 0.3 to 0.7 μm, wherein the rust preventing pigment is not present at the surface of the upper coat layer.

2. The precoated metal sheet as set forth in claim 1, further comprising a primer layer under the lower coat layer formed by a multilayer simultaneous coating system.

3. A precoated metal sheet produced by multilayer simultaneous coating, comprising a metal sheet with two or more layers of coats formed on a surface of the metal sheet using a multilayer simultaneous coating system, said precoated metal sheet characterized in that a centerline average roughness Ra of an interface of adjacent layers of coats is 0.3 to 0.7 μm and in that a maximum height of waviness of the interface from its centerline observed by a magnification of ×500 is 50% or less of the thickness of the layer positioned above the interface measured from said centerline, the waviness having a pitch of 0.5 to 1 mm.

4. The precoated metal sheet as set forth in claim 3, further comprising a primer layer under the two or more layers of coats formed using the multilayer simultaneous coating system.

5. The precoated metal sheet as set forth in claim 3, wherein said adjacent layers are the uppermost layer and the lower coat layer adjoining said uppermost layer.

6. A top clear type precoated metal sheet, comprising at least a metal sheet and two or more layers of coats formed on said metal sheet using a multilayer simultaneous coating system, said precoated metal sheet characterized in that said coats include at least a transparent or semitransparent upper clear layer and a lower coat layer adjoining said upper clear layer and in that a centerline average roughness Ra at an interface of said upper clear layer and said lower coat layer observed by a magnification of ×500 is 0.3 to 0.7 μm, the waviness having a pitch of 0.5 to 1 mm.

7. The top clear type precoated metal sheet as set forth in claim 6, wherein one or both of the lower coat layer and the upper clear layer include an ingredient reacting with both the coating resin of the lower coat layer and the coating resin of the upper clear layer.

8. The top clear type precoated metal sheet as set forth in claim 6, further comprising a primer layer under the two or more layers of coats formed using a multilayer simultaneous coating system.

* * * * *

UNITED STATES PATENT AND TRADEMARK OFFICE

CERTIFICATE OF CORRECTION

PATENT NO. : 8,968,881 B2
APPLICATION NO. : 11/792353
DATED : March 3, 2015
INVENTOR(S) : Hiroyasu Furukawa et al.

It is certified that error appears in the above-identified patent and that said Letters Patent is hereby corrected as shown below:

IN THE SPECIFICATION

Column 1, line 46, change "(1) the paintin work is" to --(1) the painting work is--;

Column 39, line 8, change "for example, 1 T when" to --for example, 1T when--;

Column 39, line 9, change "sandwiching one sheet and 2 T when" to --sandwiching one sheet and 2T when--; and Column 39, lines 11-12, change "by 2 T and cracks are not observed when bending by 3 T, the score was 3 T." to --by 2T and cracks are not observed when bending by 3T, the score was 3T.--.

Signed and Sealed this
Fifth Day of January, 2016

Michelle K. Lee
*Director of the United States Patent and Trademark Office*